US007270767B1

(12) United States Patent
Westmark et al.

(10) Patent No.: US 7,270,767 B1
(45) Date of Patent: Sep. 18, 2007

(54) ENVIRONMENTALLY FRIENDLY DE-ICER AND ANTI-ICER COMPOSITIONS

(75) Inventors: Carolyn S. Westmark, Somerville, MA (US); Kevin G. Joback, Beford, MA (US); Marina Temchenko, Swampscott, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 10/221,414

(22) PCT Filed: Oct. 18, 2000

(86) PCT No.: PCT/US00/28851

§ 371 (c)(1),
(2), (4) Date: Feb. 20, 2003

(87) PCT Pub. No.: WO01/29146

PCT Pub. Date: Apr. 26, 2001

Related U.S. Application Data

(60) Provisional application No. 60/160,143, filed on Oct. 18, 1999.

(51) Int. Cl.
*C09K 3/18* (2006.01)
(52) U.S. Cl. .......................... 252/70; 106/13
(58) Field of Classification Search .............. 252/70; 106/13
See application file for complete search history.

(56) References Cited

U.S. PATENT DOCUMENTS

| | | | |
|---|---|---|---|
| 2,101,472 A | 12/1937 | Kormann | 134/27 |
| 2,373,727 A | 4/1945 | West et al. | 106/13 |
| 2,454,886 A | 11/1948 | Sapiro | 106/128 |
| 2,716,067 A | 8/1955 | Fain et al. | 106/13 |
| 2,716,068 A | 8/1955 | Fain et al. | 106/13 |
| 2,923,692 A | 2/1960 | Ackerman et al. | 260/17.4 |
| 3,245,912 A | 4/1966 | White et al. | 252/70 |
| 3,350,314 A | 10/1967 | Dawtrey et al. | 252/70 |
| 3,362,910 A | 1/1968 | Ordelt et al. | 252/75 |
| 3,557,016 A | 1/1971 | Schuppner, Jr. et al. | 252/316 |
| 3,624,243 A | 11/1971 | Scott, Jr. et al. | 252/70 |
| 3,630,913 A | 12/1971 | Scott, Jr. et al. | 252/70 |
| 3,940,356 A | 2/1976 | Byrnes | 260/29.6 E |
| 4,358,389 A | 11/1982 | König-Lumer et al. | 252/70 |
| 4,439,337 A | 3/1984 | Nimerick et al. | 252/70 |
| 4,501,775 A | 2/1985 | Parks et al. | 427/220 |
| 4,565,643 A | 1/1986 | Arai et al. | 252/70 |
| 4,585,571 A | 4/1986 | Bloom | 252/70 |
| 4,606,835 A | 8/1986 | Lieber et al. | 252/70 |
| 4,606,836 A | 8/1986 | Gancy | 252/70 |
| 4,606,837 A | 8/1986 | McEntire et al. | 252/73 |
| 4,636,467 A | 1/1987 | Chynoweth | 435/140 |
| 4,698,172 A | 10/1987 | Tye et al. | 252/70 |
| 4,744,913 A | 5/1988 | Salvador et al. | 252/70 |
| 4,824,588 A | 4/1989 | Lin | 252/70 |
| 4,954,279 A | 9/1990 | Ma et al. | 252/70 |
| 4,978,469 A | 12/1990 | Seaman, Jr. | 252/170 |
| 5,043,088 A | 8/1991 | Falla | 252/70 |
| 5,064,551 A | 11/1991 | Smith | 252/70 |
| 5,104,711 A | 4/1992 | Marsek | 428/78 |
| 5,118,434 A | 6/1992 | Meyer et al. | 252/70 |
| 5,118,435 A | 6/1992 | Nieh | 252/70 |
| 5,135,674 A | 8/1992 | Kuhajek et al. | 252/70 |
| 5,273,673 A | 12/1993 | Ashrawi et al. | 252/70 |
| 5,290,768 A | 3/1994 | Ramsay et al. | 514/54 |
| 5,350,533 A | 9/1994 | Hubred et al. | 252/70 |
| 5,386,968 A | 2/1995 | Coffey et al. | 252/70 |
| 5,420,015 A | 5/1995 | Wuerch | 106/162 |
| 5,435,930 A | 7/1995 | Chan et al. | 252/70 |
| 5,461,100 A | 10/1995 | Jenkins et al. | 524/388 |
| 5,635,101 A | 6/1997 | Janke et al. | 252/70 |
| 5,681,882 A | 10/1997 | Jenkins et al. | 524/388 |
| 5,708,068 A | 1/1998 | Carder et al. | 524/375 |
| 5,709,812 A | 1/1998 | Janke et al. | 252/70 |
| 5,709,813 A | 1/1998 | Janke et al. | 252/70 |

(Continued)

FOREIGN PATENT DOCUMENTS

EP        0 221 269         5/1987

(Continued)

OTHER PUBLICATIONS

Anonymous, "Aircraft de-icer," Research disclosure, Mason Publications, Hampshire, GB, vol. 252, No. 46 (Apr. 1985).

*Primary Examiner*—Anthony J. Green
(74) *Attorney, Agent, or Firm*—Edwards Angell Palmer & Dodge LLP; David Conlin; Lisa Swiszcz Hazzard

(57) ABSTRACT

The invention relates to ice control formulations (deicing and anti-icing compositions) that have a tailorable BOD. The deicing compositions of the present invention comprise a) at least one first freezing point depressant (FPD) that is non-toxic, biodegradable and has a certain rate of degradation; b) at least one second FPD that is non-toxic, biodegradable, wherein the second FPD has a rate of degradation that is different from the rate of degradation of the first FPD; and c) at least one surfactant, wherein the surfactant is non-ionic, non-toxic and biodegradable, and wherein the first FPD of (a) and the second FPD of (b) are present in a ratio that provides a composition that has a predetermined biochemical oxygen demand (BOD). The invention further provides anti-icing compositions which further comprise a thickener.

34 Claims, 13 Drawing Sheets

U.S. PATENT DOCUMENTS

| | | | |
|---|---|---|---|
| 5,718,834 A | 2/1998 | Pöllmann et al. | 252/70 |
| 5,750,047 A | 5/1998 | Lemma | 252/70 |
| 5,759,436 A | 6/1998 | Schrimpf et al. | 252/70 |
| 5,772,912 A | 6/1998 | Lockyer et al. | 252/70 |
| 5,817,252 A | 10/1998 | Hu et al. | 252/70 |
| 5,853,610 A | 12/1998 | Kaes | 252/70 |
| 5,876,621 A | 3/1999 | Sapienza | 252/70 |
| 5,919,394 A | 7/1999 | Janke et al. | 252/70 |
| 5,922,240 A | 7/1999 | Johnson et al. | 252/70 |
| 5,932,135 A | 8/1999 | Janke et al. | 252/70 |
| 5,965,058 A | 10/1999 | Janke et al. | 252/70 |
| 5,968,407 A | 10/1999 | Boluk et al. | 252/70 |
| 5,980,774 A | 11/1999 | Sapienza | 252/70 |
| 5,993,684 A | 11/1999 | Back et al. | 252/70 |

FOREIGN PATENT DOCUMENTS

| | | |
|---|---|---|
| EP | 0 257 720 B1 | 12/1991 |
| EP | 1044678 | 10/1996 |
| JP | 56-133383 A * | 10/1981 |
| WO | WO 86/00919 | 2/1986 |
| WO | WO86/00919 | 2/1986 |
| WO | WO 94/05741 | 3/1994 |
| WO | WO94/05741 | 3/1994 |

* cited by examiner

ENVIRONMENTALLY FRIENDLY DE-ICER AND ANTI-ICER COMPOSITIONS

The present application claims the benefit of U.S. provisional application No. 60/160,143, filed on Oct. 18, 1999, and PCT Application No. PCT/US00/28851, filed on Oct. 18, 2000, both incorporated herein by reference.

FIELD OF THE INVENTION

The present invention relates to methods and compositions for de-icing and anti-icing surfaces, especially aircraft surfaces, in which the compositions have a tailorable rate of degradation.

BACKGROUND OF THE INVENTION

Safe operation of commercial and military aircraft during icing conditions requires the removal of ice and frozen deposits from critical surfaces prior to takeoff. Military aircraft especially must be capable of safely conducting operations in adverse winter weather if required by the mission. Mission specific readiness requirements and long intervals between successive flights expose military aircraft to ground icing weather conditions for much longer periods of time than commercial aircraft, allowing the buildup of excessive ice and snow contamination on aircraft surfaces. In addition, extensive pre-flight checks on sophisticated aircraft subsystems may require aircraft to remain on the ground, exposed to icing conditions for relatively long periods of time after being deiced (Arthur, D., Comments from a presentation on operational requirements for deicing/anti-icing fluids, 317 AS Charleston AFB Reserves, Air Force Deicing Technology Crossfeed, Washington, D.C., August, 1996). Thus, the capability to rapidly remove and prevent the reformation of ice is essential to the readiness and safety of military air operations.

For the past five decades, ice removal (deicing) of commercial and military aircraft have been accomplished by applying heated solutions of water and ethylene glycol (EG) or propylene glycol (PG) freezing point depressants (FPD). These processes use very large quantities of deicing fluids to effectively remove ice from critical aircraft surfaces and prevent its reformation. For example, an aircraft the size of a Boeing 727 commercial airliner can use between 200 and 1000 gallons of deicing fluid for a single pre-takeoff deicing procedure. According to data collected by the USAF Logistics Management Agency, the US Air Force alone uses approximately 1.2 million gallons of deicing fluid per year worldwide. Recently, commercial airlines have begun to use anti-icing fluids. These fluids are characterized by their ability to prevent ice formation on the aircraft surface for extended periods of time while the aircraft is awaiting takeoff during episodes of freezing or frozen precipitation. This extended period of ice protection, known as "holdover time", is often obtained by adding thickeners or surfactants to the fluid. About 50 gallons of anti-icing fluid are used per aircraft.

During deicing operations, thousands of gallons of aircraft deicing fluids flow off the aircraft and into the environment through storm sewers. Approximately 90 percent of deicing fluid and 15 percent of anti-icing fluid run off the aircraft in the application area. These sporadic releases of deicing fluids have caused a number of reported incidents of environmental damage near commercial airports and military installations throughout the world. For example, in 1991, the USAF decided to ban further purchase of EG-based deicing fluids because of an incident of groundwater contamination at Griffiss AFB (New York). Ethylene glycol is a listed hazardous air pollutant (HAP) and a listed groundwater pollutant in several states because of its toxicity and faces regulatory burdens in use, handling, and transportation (Oswalt, B. E., et al., "Use of Hazardous Materials for Aircraft Deicing," Report No. LM 930081, Air Force Logistics Management Agency, May, 1993). Propylene glycol, on the other hand, is an FDA approved food additive and has been shown to be virtually non-toxic to humans and terrestrial life. Glycol-based freezing point depressants (PEG and PG) have relatively low aquatic toxicity. However, additives such as corrosion inhibitors, surfactants (wetting agents) and thickening agents used in anti-icers increase the aquatic toxicity by orders of magnitude over that of pure EG or PG.

When a substance experiences aerobic biodegradation in water, it utilizes dissolved oxygen from the water. The amount of oxygen required to degrade a unit amount of substance over a specified time period is called the biochemical oxygen demand (BOD). Typically, BOD is measured over a 5 day, 20 day, or 28 day period. If a substance is allowed to biodegrade over a sufficient period of time that it achieves its ultimate state of biodegradation, it will exert its ultimate or total BOD. Substances with a high BOD may deplete the dissolved oxygen in a receiving body of water such that the remaining dissolved oxygen is insufficient to support aquatic life. Typical environmental regulatory guidelines call for a minimum dissolved oxygen content in receiving waters of 5 mg/L. The five-day biochemical oxygen demand (BOD) for glycol-based freezing point depressants and commercially available deicing and anti-icing fluids range from about 400 to 800 g/kg, much greater than those found in typical raw municipal sewage (D'Itri, F. M., "Deicers in Airport Stormwater Runoff," in *Chemical Deicers and the Environment*, p. 327, Lewis Publishers, 1991).

As a result of these adverse environmental impacts, the US Environmental Protection Agency (US EPA), and state and local environmental agencies have promulgated increasingly stringent regulations affecting aircraft deicing fluid runoff. The Clean Water Act Amendment of 1987 requires airports to obtain a National Pollutant Discharge Elimination System (NPDES) permit to discharge deicing fluids into the storm sewer. These permits limit the concentration and nature of pollutants being discharged into the storm sewer and require implementation of a pollution prevention plan to reduce the amount of pollutants released to the environment.

In order to comply with environmental regulations, a number of commercial airports have elected to install systems designed to capture and control runoff from deicing operations. Once the runoff is captured, it must be contained for treatment. Biological treatment of runoff is increasingly gaining favor. This method contains the deicing fluid runoff in holding tanks or lagoons until either the glycol is sufficiently biodegraded or the water can be safely metered out to a publicly owned treatment works (POTW) or an on-site bioreactor. Treatment costs at a POTW are often related to the BOD content of the waste stream. In addition, waste streams with high ultimate BODs must be metered into the POTW slowly in order to avoid creating anaerobic conditions in the treatment system. Due to the high ultimate BOD of deicing and anti-icing fluids, treatment costs are quite high and put a tremendous demand on the capacity of a biotreatment facility. The cost of environmental compliance has greatly increased the life cycle cost of deicing fluids over the past decade. In fact, if the cost of purchase, handling and disposal of deicing fluids is considered, one deicing expert estimates the total life cycle cost of a gallon of glycol based deicer at $17 to 21 per gallon (Williams, L., "Comments from a presentation on forced air deicing equipment," FMC Corporation, Air Force Deicing Technology Crossfeed, Washington, D.C., August, 1996; Lamb, C. B. and Jenkins, G. F., "BOD of Synthetic Organic Chemicals," *Proc. 7th Ind. Waste Conf.,* 79, pp. 326-339, 1952).

Fluids containing glycol freezing point depressants have typically been used to remove ice or prevent ice from forming on aircraft prior to takeoff. Commercially available deicing fluids (SAE Type I) largely consist of combinations of ethylene glycol, diethylene glycol or propylene glycol freezing point depressants with water. These fluids may also contain surfactants, corrosion inhibitors, dyes, pH buffers, and chelating agents to produce required properties. Commercially available anti-icing fluids (SAE Types II, III, and IV) contain similar ingredients plus a thickener or a combination of surfactants to impart non-Newtonian rheological properties.

It would be desirable to have deicing and/or anti-icing compositions that are biodegradable and non-toxic to animals and the environment. It would also be useful to be able to control or tailor the biodegradation rate, or short term (five-day) and ultimate BOD, of these compositions, depending on the environmental and hydrogeological conditions that prevail in a given body of receiving water. For example, if an airport's deicing fluid runoff enters a small, slow-moving body of water with limited ability to replenish dissolved oxygen from the atmosphere, a rapidly degrading substance with a high short term (5-day) BOD will deplete dissolved oxygen levels more than a slowly degrading substance with a lower short term (5-day) BOD. If dissolved oxygen depletion is severe enough, this condition may lead to the death of aquatic organisms in the receiving water body. On the other hand, if the fluid runoff is captured and subsequently biotreated, a slowly degrading substance with a lower short term (5-day) BOD will require longer treatment times, necessitating a larger treatment facility volume compared to a rapidly degrading fluid.

SUMMARY OF THE INVENTION

This invention pertains to the development of environmentally-advantaged ice control materials which meet or exceed current performance requirements, are non-toxic to workers, and are inherently less damaging to the environment. Some of these formulations can be safely released to the environment without required runoff capture or post-treatment to achieve permit compliance. Other formulations can be captured and treated more efficiently and at lower cost than currently available fluids. The invention also relates to the development of efficient, high performance ice control materials which reduce the amount of fluid needed to effectively protect aircraft from ice formation. The term "ice control material" refers to deicers and anti-icers. Anti-icing fluids offer additional source reduction benefits because less material is wasted on runoff and overspray and repeat applications of fluids are avoided.

In particular, the invention relates to deicing compositions that have a tailorable BOD or rate of biodegradation. The deicing compositions of the present invention comprise a) at least one first freezing point depressant (FPD) that is non-toxic, biodegradable and has a certain, i.e., predetermined, rate of degradation; b) at least one second FPD that is non-toxic, biodegradable, wherein the second FPD has a rate of degradation that is different from the rate of degradation of the first FPD; and c) at least one surfactant, wherein the surfactant is non-ionic, non-toxic and biodegradable, and wherein the first FPD of (a) and the second FPD of (b) are present in a ratio that provides a composition that has a predetermined biochemical oxygen demand (BOD) and rate of biodegradation.

The present invention also relates to anti-icing compositions that have a tailorable BOD. Preferred compositions comprise a) at least one first freezing point depressant (FPD) that is non-toxic, biodegradable and has a certain, i.e., predetermined, rate of degradation; b) at least one second FPD that is non-toxic, biodegradable, wherein the second FPD has a rate of degradation that is different from the rate of degradation of the first FPD; c) at least one surfactant, wherein the surfactant is non-ionic, non-toxic and biodegradable; and d) at least one thickener that is non-toxic and biodegradable; wherein the first FPD of (a) and the second FPD of (b) are present in a ratio that provides a composition that has a predetermined biochemical oxygen demand (BOD).

One embodiment of the present invention which is a slow degrading deicing fluid formulation contains a slow degrading freezing point depressant, e.g., triethylene glycol, and optionally, a rapidly degrading freezing point depressant, e.g., glycerol. This formulation also contains a biodegradable, non-ionic surfactant, with low aquatic toxicity, e.g., ethoxylated sorbitan esters, polyoxyethylene esters, alcohol ethoxylates, alkyl polyglycosides. Such a formulation would contain the slow degrading FPD at about 50-99.9%, the rapidly degrading freezing point depressant at about 0-50%, and the surfactant at about 0.1-1.0%.

One example of a rapidly degrading, i.e., "biotreatable", deicing fluid contains: a rapidly degrading freezing point depressant, e.g., glycerol and a biodegradable, non-ionic surfactant, with low aquatic toxicity, e.g., ethoxylated sorbitan esters or polyoxyethylene esters. Optionally, water is added to reduce viscosity and enhance blending and flow characteristics of deicer fluid. In such formulations, the FPD is present at about 75-99.9% and the surfactant is about 0.1-1.0%. Water may be used up to about 25%.

Similarly, the present invention provides for anti-icing fluids with tailorable rates of degradation. For example, the present invention provides for an anti-icing compositions with a low short term (5-day) BOD to reduce the dissolved oxygen impact on receiving waters. This type of fluid comprises a slow degrading FPD, e.g., triethylene glycol, as its primary freezing point depressant. It may further contain a rapidly degrading FPD, such as glycerol or another, e.g., propylene glycol, to tailor the degradation rate to meet specific requirements for a given airport runoff scenario. This formulation also contains a non-toxic, biodegradable, thermally stable, non-Newtonian, polysaccharide thickener, e.g., welan gum, and a biodegradable, non-ionic surfactant, with low aquatic toxicity, e.g., ethoxylated sorbitan esters, polyoxyethylene esters, alcohol ethoxylates, alkyl polyglycosides.

One embodiment of an anti-icing formulation preferably contains 30-70% of a slow degrading freezing point depressant, e.g., triethylene glycol, and optionally, up to about 50% of a rapidly degrading freezing point depressant, e.g., glycerol. This formulation also contains from about 0.1-1.0% of a polysaccharide thickener such as welan gum and from about 0.1-1.0% of a non-ionic surfactant. The balance is water.

The present invention also provides for anti-icing compositions with enhanced biotreatability. Such formulations utilize a freezing point depressant, e.g., glycerol, that is 100% biodegradable and has lower ultimate BOD than propylene glycol based fluids but approximately the same 5 day (short term) BOD. The formulation contains surfactant and thickener additives that are also 100% biodegradable The fluid's rapid degradation rate and reduced BOD are useful to airports that capture and treat their deicing fluid runoff in a waste water treatment system, a lagoon, or some other form of biotreatment system. An example of such an anti-icing formulation contains from about 30-70% of a rapidly degrading freezing point depressant, e.g., glycerol, from about 0.1-1.0% of a non-toxic, biodegradable, thermally stable, non-Newtonian, polysaccharide thickener, e.g., welan gum, from about 0.1-1.0% of a biodegradable, non-ionic surfactant, with low aquatic toxicity, e.g., ethoxylated sorbitan esters, polyoxyethylene esters, alcohol ethoxylates, alkyl polyglycosides. The balance is water. An anti-icing fluid formulation that is 100% biodegradable (including additives) can also be made based on the above formulations.

Preferred deicing fluids of the present invention comprise a freezing point depressant selected from triethylene glycol, glycerol, or a mixture of the two, and a biodegradable, low toxicity surfactant in an amount from about 0.1-1.0% by weight of the composition. Other optional additives comprise dyes, preferably water soluble, and corrosion inhibitors. See e.g., Sastri, V. S., "Corrosion Inhibitors: Principles and Applications", John Wiley and Sons, May, 1998; Flick, Ernest, "Corrosion Inhibitors: An Industrial Guide", Noyes Publications, July, 1993.

The FPDs of deicing and anti-icing fluid formulations must be miscible in water, have a flash point greater than 100° C., be non-corrosive, be non-damaging to aircraft coatings and canopy materials, and depress the freezing point of water to −32° C. or lower. The FPDs for a specific formulation are selected from among a group of compounds meeting all of these requirements by one of ordinary skill in the art based upon the low human toxicity of the FPD, the BOD for the FPD and the desired BOD of the resulting ice-control composition. Examples of FPDs comprise triethylene glycol, glycerol, propylene glycol, 1,3 butanediol, and tetraethylene glycol. One example of a slow degrading freezing point depressant is triethylene glycol, and one example of a rapidly degrading freezing point depressant is glycerol.

The degradation rate of the ice control compositions and of the individual components of the compositions can readily be determined by one of ordinary skill in the art in accordance with the teachings herein and by methods known in the art. For example, as described further below, BOD and biodegradation rates can be input to computer models to estimate dissolved oxygen depletion in receiving waters.

Preferred anti-icing fluids of the present invention comprise (1) a freezing point depressant selected from triethylene glycol, glycerol, or a mixtures of the two, (2) a biodegradable, low toxicity surfactant, and (3) a thickener. Preferred thickeners comprise a non-Newtonian, low toxicity, biodegradable, thermally stable thickener. Examples of preferred thickeners include polysaccharides or combinations of polysaccharides and clays. In preferred embodiments, the clay is hydrophobically modified clay. In certain compositions, water is added and optionally, other additives such as dyes, preferably water soluble, and corrosion inhibitors.

In an example of a preferred anti-icer, the components are present in the following amounts: 30-70% FPD, 30-70% water, 0.01-1.0% biodegradable, low toxicity surfactant, 0.1-1.0% non-Newtonian, low toxicity, biodegradable, thermally stable, polysaccharide thickener. Examples of thickeners include welan gum, thermally stable xanthan gum, and combinations of a hydrophobically modified clay and a pdysaccharide, e.g., welan or thermally stable xanthan. A preferred thickener comprises welan gum.

The surfactant for use in the present ice control formulations comprises a biodegradable, non-ionic surfactant, having low aquatic toxicity. Surfactants in the previously described deicer and anti-icer formulations can be selected such that the formulation possesses very low aquatic toxicity (48 hour daphnia magna LC50>10,000 ppm). Examples include, e.g., ethoxylated sorbitan esters, polyoxyethylene esters, alcohol ethoxylates, and alkyl polyglucosides.

In preferred embodiments of "slow-degrading" fluids, the 5-day BOD is in the range of about 40 g/kg to 840 g/kg. For "biotreatable fluids", ultimate BOD is less than approximately 1680 g/kg and 5-day BOD>approximately 90% of ultimate BOD.

Preferred anti-icing fluid compositions of the present invention have a Wet Spray Endurance Test (WSET) holdover time of greater than about 20 minutes. Preferred deicing fluid compositions of the present invention, when diluted with water to a ratio of 50:50, have a Wet Spray Endurance Test (WSET) holdover time of greater than about 3 minutes.

Other compositions of the present invention further comprise a corrosion inhibitor. Examples of corrosion inhibitors are known by the one of ordinary skill in the art.

The invention also relates to a method of selecting the biodegradation rate and 5-day BOD of a de-icing and anti-icing composition. Preferred methods comprise: a) providing at least one first freezing point depressant (FPD) that is non-toxic, biodegradable and has a certain rate of degradation; b) providing at least one second FPD that is non-toxic, biodegradable and has a rate of degradation that is different from the rate of degradation of the first FPD; and c) providing at least one surfactant, wherein the surfactant is non-ionic, non-toxic and biodegradable; wherein the first FPD of (a) and the second FPD of (b) are present in a ratio that provides a composition that has a predetermined biochemical oxygen demand (BOD).

To any of these formulations, one or ordinary skill in the art could add certain additives, e.g., corrosion inhibitor or water soluble dye, to enhance performance or meet specific user requirements.

The present invention provides for ice control fluids with tailorable degradation rates which can be supplied as a concentrate for dilution with water by the user to obtain the desired mixture freezing point.

The invention further relates to a process for anti-icing or deicing an exterior surface of an aircraft, comprising applying to the exterior of the aircraft a deicing composition comprising: a) at least one first freezing point depressant (FPD) that is non-toxic, biodegradable and has a certain rate of degradation; b) at least one second FPD that is non-toxic, biodegradable, wherein the second FPD has a rate of degradation that is different from the rate of degradation of the first FPD; and c) at least one surfactant, wherein the surfactant is non-ionic, non-toxic and biodegradable; wherein the first FPD of (a) and the second FPD of (b) are present in a ratio that provides a composition that has a predetermined biochemical oxygen demand (BOD).

DETAILED DESCRIPTION OF THE INVENTION

Deicing fluids are applied to aircraft upon which frozen deposits (ice, frost, and snow) have already formed. The fluids are heated prior to application to aid in melting the frozen deposits for ease of removal. Deicing fluids normally have Newtonian viscosity profiles (i.e. their viscosity is independent of the rate of shear application) and do not have substantial holdover time. "Holdover time" is defined as the amount of time between the application of an ice control fluid and the time that frozen contamination first re-appears on the aircraft surface. A standard measure of holdover time is the Wet Spray Endurance Test (WSET), defined in AMS 1428 (Aerospace Material Specification 1428, "Fluid, Aircraft Deicing/Anti-icing Non-Newtonian (pseudoplastic), SAE Types II, III & IV," SEA International, 400 Commonwealth Drive, Warrendale, Pa. 15096-0001). This test measures the resistance to freezing of a test panel coated with an ice control fluid and exposed to conditions simulating the meteorological parameters of light freezing rain.

Anti-icing fluids (SAE Types II, III, and IV) are defined as ice control fluids with extended holdover time. Holdover times range from a minimum of 20 minutes in the WSET for Type II fluids to a minimum of 80 minutes in the WSET for Type IV fluids. Many commercially available fluids contain a synthetic polymeric thickener additive that imparts non-Newtonian rheological properties to the fluid. The non-Newtonian properties of the fluid allow it to remain adhered to the aircraft surfaces, including sloped or vertical surfaces, while the aircraft is at rest (i.e. the fluid is in a zero or low shear condition). When the aircraft accelerates down the runway for takeoff, the rate of shear on the anti-icing fluid surface increases rapidly, and since the fluid is non-Newtonian and shear-thinning, the viscosity of the fluid drops dramatically and the fluid flows from the wings. This aspect of the anti-icers of the present invention is further described below.

Figure 1:
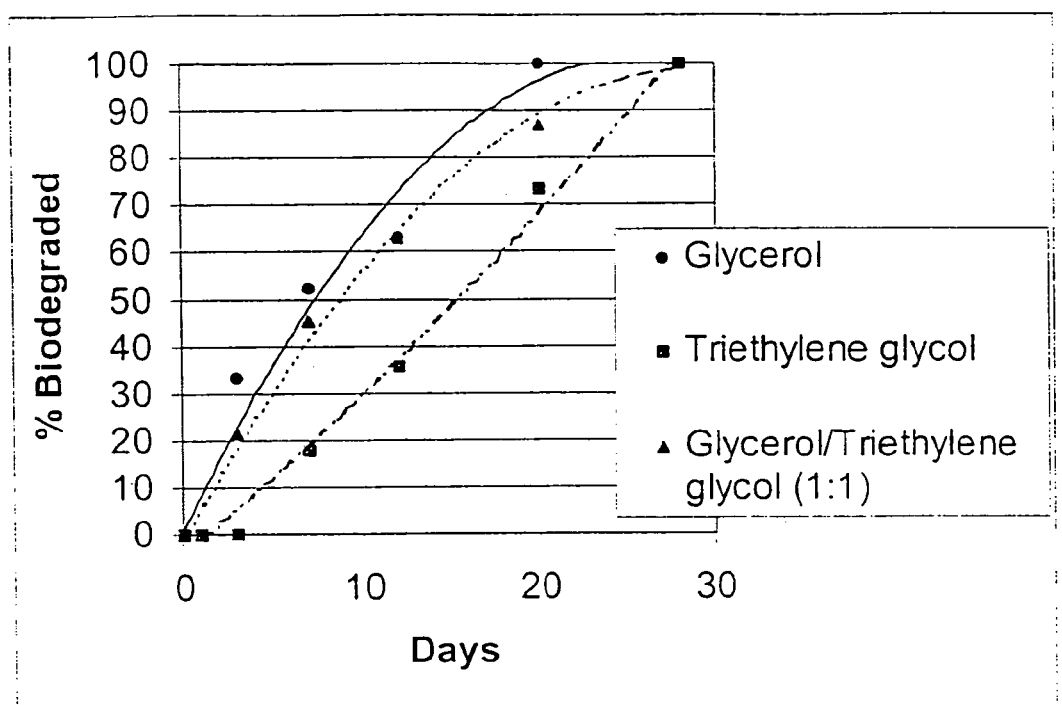
FIG. 1 shows the biodegradation rate of glycerol, triethylene glycol and a 50:50 mixture of glycerol and triethylene glycol.

The present invention provides ice control formulations, which have a predetermined rate of degradation. The term "predetermined" as used herein refers to a "controlled" or "tailored" rate of degradation and is accomplished by altering the selection and amounts of the freezing point depressants. The FPDs are selected to produce various biodegradation rates, and thus, various short term (5 day) BODs. This is done, for example, by mixing a FPD with a slow rate of degradation with varying amounts of FPD with a rapid rate of degradation. For example, in one embodiments of the present invention, triethylene glycol, which degrades slowly and has a low 5-day BOD, is mixed with varying amounts of glycerol, which degrades rapidly and has a higher 5 day BOD. The degradation rates of triethylene glycol, glycerol, and a 50/50 mixture of triethylene glycol and glycerol are shown in FIG. 1.

AMS Requirements of Ice Control Formulations

Aircraft ice control fluids (deicers and anti-icers) must meet a rigorous set of performance and materials compatibility requirements, set forth by AMS 1424 (deicing fluids) and AMS 1428 (anti-icing fluids). (Aerospace Material Specification 1424, "Deicing/Anti-icing Fluid, Aircraft SAE Type I," SEA International, 400 Commonwealth Drive, Warrendale, Pa. 15096-0001; Aerospace Material Specification 1428, "Fluid, Aircraft Deicing/Anti-icing Non-Newtonian (pseudoplastic), SAE Types II, III & IV," SEA International, 400 Commonwealth Drive, Warrendale, Pa. 15096-0001). The contents of these specifications are incorporated in their entirety. These requirements differ substantially from the requirements for deicers or anti-icers designed for application to pavement, e.g., roadways or airport runways. Ice control formulations for use on aircraft must have the following characteristics: low freezing point; high flash point; low corrosivity; non-damaging to plastics and coatings; shelf stable and thermally stable. In addition, anti-icers must be capable of preventing ice formation on aircraft surfaces for extended periods of time and be capable of shedding from the aircraft wings on take-off. The compositions of the present invention meet these criteria.

The ice control fluids of the present invention have a freezing point that is 10° C. below the outside air temperature at which it is applied. AMS 1428 requires a maximum freezing point of −32° C. for anti-icing fluids. Deicing fluids can be mixed by the user with water in proportions which supply a suitable freezing point for the conditions of usage. In general, it is desirable for a deicing fluid to be capable of producing an aqueous solution with a freezing point of about −40° C., as this will be suitable under nearly all naturally occurring environmental conditions.

The de-icers and anti-icers of the present invention have a high flash point. The flash point of deicing and anti-icing fluids must be greater than 100° C. to avoid creating fire hazards when the fluid is heated. This requirement effectively eliminates the use of highly volatile freezing point depressants (those with flash points less than 100° C.).

The anti-icing and deicing fluids of the present invention are not corrosive to metals commonly found on aircraft, including aluminum alloys, magnesium alloys, titanium alloys, and various types of steel. The fluids do not induce stress corrosion cracking in titanium or hydrogen embrittlement in high strength steels. Table 1 shows the results of corrosion tests performed on various formulation ingredients and mixtures. These results meet the requirements of AMS 1424 and AMS 1428 for aircraft deicers and anti-icers. In addition, the fluids do not contain alkali metals such as potassium or sodium, which promote high temperature corrosion of metal alloys commonly found in aircraft engines. Fluids containing alkali metals, such as alkali metal acetate based fluids used for runway and roadway deicing, may cause accelerated corrosion of engine components at high temperatures. This is one reason that alkali-metal containing fluids have not been previously used as deicers or anti-icers for direct application to aircraft.

TABLE 1

Corrosion tests.

| Material | Corrosion test | Method or Test Conditions | Result |
|---|---|---|---|
| Triethylene glycol (99% pure) | Stress corrosion cracking | ASTM F 945, using AMS 4911 and AMS 4916 alloys | No cracking observed |
| Triethylene glycol (99% pure) | Hydrogen embrittlement | ASTM F 519 | No failures in 150 hours |
| 50 wt % triethylene glycol/50 wt % water | Stress corrosion cracking | ASTM F 945, using AMS 4911 and AMS 4916 alloys | No cracking observed |
| 50 wt % triethylene glycol/50 wt % water | Hydrogen embrittlement | ASTM F 519 | No failures in 150 hours |
| 49.9 wt % triethylene glycol/49.9 wt % water/0.2 wt % welan gum | Stress corrosion cracking | ASTM F 945, using AMS 4911 and AMS 4916 alloys | No cracking observed |
| 49.9 wt % triethylene glycol/49.9 wt % water/0.2 wt % welan gum | Hydrogen embrittlement | ASTM F 519 | No failures in 150 hours |
| 24.9 wt % triethylene glycol/75.0 wt % water/0.1 wt % welan gum | Stress corrosion cracking | ASTM F 945, using AMS 4911 and AMS 4916 alloys | No cracking observed |
| 24.9 wt % triethylene glycol/75.0 wt % water/0.1 wt % welan gum | Hydrogen embrittlement | ASTM F 519 | No failures in 150 hours |
| Glycerol (99.5% pure) | Stress corrosion cracking | ASTM F 945, using AMS 4911 and AMS 4916 alloys | No cracking observed |
| Glycerol (99.5% pure) | Hydrogen embrittlement | ASTM F 519 | No failures in 150 hours |
| 50 wt % glycerol/50 wt % water | Stress corrosion cracking | ASTM F 945, using AMS 4911 and AMS 4916 alloys | No cracking observed |
| 50 wt % glycerol/50 wt % water | Hydrogen embrittlement | ASTM F 519 | No failures in 150 hours |

The anti-icing and deicing fluids of the present invention are also non-damaging to plastics and coatings. Aircraft deicing and anti-icing fluids must not damage typical non-metallic components of aircraft, including aircraft canopy materials and aircraft coatings. This requirement effectively eliminates organic materials with strong solvent characteristics towards polyurethane or a tendency to craze polycarbonate or acrylic materials.

The compositions of the present invention are non-damaging to aircraft coatings and canopy materials. Table 2 shows the results of plastic crazing tests and tests of effects on aircraft coatings using the ingredients and mixtures of formulations of the present invention. Tests were performed in accordance with conditions in AMS 1424 and AMS 1428. These results indicate that all ingredients and mixtures tested meet the requirements of AMS 1424 and AMS 1428 except pure (undiluted) triethylene glycol. Undiluted triethylene glycol (similar to propylene glycol, a freezing point depressant used in commercially available deicing and anti-icing fluids) causes slight crazing of acrylic plastic, a material used in some aircraft canopies. This indicates that deicing fluid compositions which consist of a concentrate of triethylene glycol (without added water) should not be allowed to be applied to an aircraft as a concentrate.

TABLE 2

Plastic crazing tests.

| Fluid Ingredient or Mixture | Test | Method | Materials Tested | Results |
|---|---|---|---|---|
| Triethylene glycol (99% pure) | Plastic crazing | ASTM F 484 | MIL-PRF-25690 acrylic, MIL-P-83310 polycarbonate | Crazed acrylic; no crazing on polycarbonate |
| Triethylene glycol (99% pure) | Effect on aircraft coatings | ASTM F 502 | MIL-C-85285 polyurethane | No effect |
| 50 wt % triethylene glycol/50 wt % water | Plastic crazing | ASTM F 484 | MIL-PRF-25690 acrylic, MIL-P-83310 polycarbonate | No crazing evident |
| 50 wt % triethylene glycol/50 wt % water | Effect on aircraft coatings | ASTM F 502 | MIL-C-85285 polyurethane | No effect |
| 49.9 wt % triethylene glycol/49.9 wt % water/0.2 wt % welan gum | Plastic crazing | ASTM F 484 | MIL-PRF-25690 acrylic, MIL-P-83310 polycarbonate | No crazing evident |
| 49.9 wt % triethylene glycol/49.9 wt % water/0.2 wt % welan gum | Effect on aircraft coatings | ASTM F 502 | MIL-C-85285 polyurethane | No effect |
| 24.9 wt % triethylene | Plastic crazing | ASTM F 484 | MIL-PRF-25690 acrylic, | No crazing evident |

TABLE 2-continued

Plastic crazing tests.

| Fluid Ingredient or Mixture | Test | Method | Materials Tested | Results |
|---|---|---|---|---|
| glycol/75.0 wt % water/0.1 wt % welan gum | | | MIL-P-83310 polycarbonate | |
| 24.9 wt % triethylene glycol/75.0 wt % water/0.1 wt % welan gum | Effect on aircraft coatings | ASTM F 502 | MIL-C-85285 polyurethane | No effect |
| Glycerol (99.5% pure) | Plastic crazing | ASTM F 484 | MIL-PRF-25690 acrylic, MIL-P-83310 polycarbonate | No crazing evident |
| Glycerol (99.5% pure) | Effect on aircraft coatings | ASTM F 502 | MIL-C-85285 polyurethane | No effect |
| 50 wt % glycerol/50 wt % water | Plastic crazing | ASTM F 484 | MIL-PRF-25690 acrylic, MIL-P-83310 polycarbonate | No crazing evident |
| 50 wt % glycerol/50 wt % water | Effect on aircraft coatings | ASTM F 502 | MIL-C-85285 polyurethane | No effect |
| Propylene glycol (>99% pure) | Plastic crazing | ASTM F 484 | MIL-PRF-25690 acrylic, MIL-P-83310 polycarbonate | Slight crazing |
| Propylene glycol (>99% pure) | Effect on aircraft coatings | ASTM F 502 | MIL-C-85285 polyurethane | No effect |
| 50 wt % propylene glycol/50 wt % water | Plastic crazing | ASTM F 484 | MIL-PRF-25690 acrylic, MIL-P-83310 polycarbonate | No crazing evident |
| 50 wt % propylene glycol/50 wt % water | Effect on aircraft coatings | ASTM F 502 | MIL-C-85285 polyurethane | No effect |

Preferred anti-icing and deicing fluids of the present invention have a stable shelf life and are thermally stable. Deicing and anti-icing fluids are purchased, stored, and used in bulk over the course of one or more deicing seasons. Thus, their properties must remain stable over periods of time of up to one year. Anti-icers must also be able to retain their rheological properties after exposure to elevated temperatures for long durations (70° C. for 30 days). That is, they are thermally stable.

Anti-icers must be capable of preventing ice formation on aircraft surfaces for extended periods of time. This period of time, known as holdover time, is at least about 20 minutes, according to the standard WSET test for fluids designated as Type II and more than about 80 minutes according to the standard WSET test for fluids designated as Type IV. The requirement for extended holdover time implies that an anti-icing fluid must effectively wet out and completely coat an aircraft's surface upon spray application. It also implies that the fluid must form a barrier film of sufficient thickness to prevent freezing precipitation from penetrating to the aircraft surface under low shear conditions. The anti-icers must shed from the aircraft wings on take-off. Thus, the anti-icing fluids possess a non-Newtonian (shear-thinning) viscosity profile with sufficiently low high shear viscosity. The anti-icing compositions of the present invention meet these criteria.

There are additional characteristics of deicing and anti-icing fluids, which, although not currently required by AMS 1428 or AMS 1424, are deemed necessary in order to produce a safe, effective, commercially viable deicing or anti-icing fluid. One such notable characteristic is low conductivity. Fluids which are ionic in nature have a much higher electrical conductivity than fluids that are non-ionic. For example, potassium acetate runway deicers have very high electrical conductivities compared to runway deicing fluids based on glycols (ethylene or propylene) which do not contain organic salts. Applying fluids with high electrical conductivity presents a risk to aircraft electrical systems. If a conductive fluid contacts an improperly insulated electrical circuit, short circuiting will result. The compounds of the present invention have low conductivity.

Environmental Concerns

As aforesaid, presently used deicers and anti-icers pose significant threats to the environment. The key environmental concerns with respect to the use of ice control fluids are BOD loading and toxicity (human/mammalian and aquatic).

The present invention provides for deicing and anti-icing compositions that are environmentally advantaged. The term "environmentally advantaged" as used herein refers to compounds that: have low toxicity to humans and terrestrial animals and plants; have low toxicity to aquatic organisms and plants (LC50 preferably less than 10,000 ppm in a 48 hour acute daphnia magna test); are non-persistent and non-bioaccumulating (degrades in the environment and does not tend to accumulate in the tissues of organisms) and have a low risk of secondary toxicity effects through depletion of dissolved oxygen.

Compounds have a low risk of secondary toxicity effects through depletion of dissolved oxygen in receiving waters if they are either a "biotreatable" fluid or a "Low Dissolved Oxygen Impact Fluid". A biotreatable fluid is a 100% degradable fluid which degrades rapidly and contains no ingredients with high toxicity to microorganisms, and a reduced ultimate BOD (lower than commercially available fluids). This is applicable to users who capture and treat their runoff. A "Low Dissolved Oxygen Impact Fluid" is a fluid containing a slowly degrading FPD that reduces the rate of removal of dissolved oxygen from receiving waters. This is applicable to users who release their fluid directly into receiving waters without treatment. The present invention allows one of ordinary skill in the art to control the BOD of the ice control formulation to manufacture either a biotreatable fluid or a low dissolved oxygen impact fluid, depending on which type of fluid is desired.

Preferred formulations of the present invention have a rate of degradation such they comply with the requirements of the regulatory agencies, e.g., the EPA, for dissolved oxygen in the receiving waters. For example, preferably the formulations result in a dissolved oxygen rate that does not fall below about 5 mg/liter.

Freezing Point Depressants

The deicing fluids of the present invention comprise the following components: freezing point depressant (FPD); surfactants; and optionally, corrosion inhibitors, dyes and buffers. A freezing point depressant is used in the formulations to melt any incoming precipitation and to prevent the fluid itself from freezing as the fluid cools to ambient temperature. This ingredient has the highest concentration in the fluid; combined with water, it makes up over about 98% of the fluid.

As aforesaid, there are environmental issues associated with deicers and anti-icers, mostly as a result of the type of FPD used. Freezing point depressants are typically toxic to mammals. Ethylene glycol, in particular, is toxic to mammals (see rat LD50 data, Table 3). LC50, refers to Lethal Concentration, 50%, which is the concentration of a substance at which 50% of the population of test organisms die. Ethylene glycol has also been listed by the EPA as a hazardous air pollutant (HAP).

TABLE 3

Acute rat oral toxicity of selected freezing point depressants.

| Freezing Point Depressant | Rat Acute Oral Toxicity (LD50, g/kg) |
|---|---|
| Ethylene glycol | 4.7 |
| 1,3 Butanediol | 18.6 |
| Propylene glycol | 20 |
| Triethylene glycol | 17 |
| Glycerol | 12.6 |

Preferred FPDs for use in the present invention include FPDs which are not toxic to mammals and the environment. One of ordinary skill in the art can readily select FPDs that are useful in the present invention, e.g., based on the LD50 of the FPD. Examples of preferred FPDs include, but are not limited to, propylene glycol, glycerol, and triethylene glycol, which are far less toxic to mammals than EG. High LD50 numbers indicate lower toxicity. (Table 3) Toxicity studies on humans also indicate similar differences in toxicity among the glycols and glycerol.

Another aspect of concern is the toxicity of FPDs on aquatic life and environment. Preferred FPDs for use in the present invention have low aquatic toxicity, e.g., all of the glycols and glycerol have very low aquatic toxicity. (see Table 4, FPD aquatic toxicity data).

TABLE 4

Aquatic toxicity of freezing point depressants and two types of non-ionic, biodegradable surfactants.

| Compound | Acute tox. to D. Magnia, ppm (48 hr LC50) |
|---|---|
| Ethylene glycol | 77,000 |
| Propylene glycol | 55,000 |
| Triethylene glycol | 66,000 |
| Glycerol | |
| PEG-12 oleate (tradename: Emerest 2660) | 13,000 |
| PEG-20 sorbitan oleate (tradename: EMSORB 6900) | 46,000 |
| Commercially available PG based anti-icing fluid | 2,600 |

Furthermore, preferred FPDs for use in this invention are highly biodegradable. For example, the glycols and glycerol FPDs are all fully biodegradable. Preferred FPDs, e.g., TG, PG and glycerol, are water soluble (as opposed to fat-soluble), so they do not persist in the environment, bioaccumulate, i.e., build up in the tissues or organs of animals or plants, or build up in sediments or soils.

In addition, ice-control formulations typically have secondary toxicity effects. Some of the FPDs, e.g., propylene glycol, glycerol, and ethylene glycol, biodegrade very rapidly. These are classified herein as FPDs having a fast rate of degradation (higher 5 day BOD). During aerobic biodegradation, these materials consume oxygen from the receiving waters. The mass of oxygen required to fully degrade a unit mass of material is referred to as biochemical oxygen demand (BOD). It is generally expressed in units of grams per kilogram or parts per million. The general stoichiometric equation showing the complete degradation to carbon dioxide and water (mineralization) of an organic compound containing x carbon atoms, 2y hydrogen atoms, and z oxygen atoms is:

$$C_xH_{2y}O_z + (2x+y-z)O_2 \rightarrow xCO_2 + yH_2O$$

The theoretical oxygen demand (ThOD) is the amount of oxygen that would be consumed from the environment by the chemical if it were fully degraded. This number is usually reported in units of g/g (grams of oxygen per gram of organic substance). It can be calculated using the following equation:

$$ThOD = 16(2x+y-z)/(6x+y+4z)$$

For completely degradable compounds such as the glycols and glycerol, the BOD of the substance measured over time eventually approaches the ThOD. BOD measurements are generally made over a limited period of time. For example, a common measurement of BOD is the 5-day BOD. This is the amount of oxygen required to degrade the pollutant in water over a 5-day period. Since some chemicals do not fully degrade in 5 days, the 5-day BOD for these chemicals will be less than the ThOD. Comparing the 5-day BOD and the 20-day BOD of a substance to its ThOD is one method known in the art for establishing a degradation rate of a substance of interest.

When it is desired to have a rapidly degrading ice control formulation, FPDs are selected that have a BOD that approaches the ThOD for that FPD (i.e. the 5-day BOD should be greater than about 90% of the ThOD). In addition, it is desirable in these cases to have a fluid formulation consisting entirely of fully biodegradable components (ultimate BOD>98% of ThOD). A rapidly degrading, fully biodegradable fluid is preferred for airports that capture and treat aircraft deicing and anti-icing process runoff in a biotreatment facility such as a wastewater treatment plant or a holding pond.

However, high BOD substances, especially those which degrade rapidly, can deplete the dissolved oxygen in receiving waters if they are released without treatment. This may cause a localized reduction of dissolved oxygen below levels necessary to sustain aquatic life. Environmental regulations sometimes require a minimum level of dissolved oxygen in receiving waters. The level of dissolved oxygen in any body of water is dependent on many environmental and hydrogeological factors. Some bodies of water, due to their large volume, rapid movement, or high degree of re-aeration can assimilate larger quantities of high BOD pollutants than other bodies of water (for example, those with small volumetric flows and slow velocities.) In cases where deicing and anti-icing fluid runoff is released directly the environment without pre-treatment, it is beneficial to use a fluid which biodegrades slowly, but completely. The analysis that follows demonstrates this concept.

A numerical model was used in formulating the ice control compositions of the present invention to determine the impact of BOD loading on dissolved oxygen concentration under several scenarios. The model solves two differential mass balance equations, one each for BOD and dissolved oxygen. The equations consider loading, advection, BOD deoxygenation, reaeration, and longitudinal dispersion. The duration of the FPD discharge can be varied within the model. For the purposes of analysis, a one-day discharge of a mass of fluid representative of fluid usage at a medium sized airport during winter storm conditions was specified.

When solved for steady-state conditions and without consideration of dispersion, these equations give identical results to a Streeter-Phelps model solution. The Streeter-Phelps model predicts dissolved oxygen concentration in the receiving water using the following equation:

$$DO = DO_0 - (BOD)(C)(1 - e^{-kt})$$

Where:
DO=dissolved oxygen at time t
$DO_0$=initial dissolved oxygen
BOD=biochemical oxygen demand of the fluid
C=concentration of the fluid
k=degradation rate constant of the fluid
t=time after fluid enters receiving waters The model receiving waters were based on actual conditions in bodies of water which receive deicing fluid runoff at two medium sized commercial airports in the United States (Milwaukee, Wis. and Portland, Oreg.). Receiving Water No. 1 was specified as a wide, deep, slow-moving stream with little assimilative capacity and long travel times between the point of discharge and the mouth of the stream. Receiving Water No. 2 was specified as a narrow, shallow, fast-flowing stream with a travel time of under two days. The model scenarios are outlined in Table 5.

TABLE 5

Scenarios for runoff water quality modeling.

| Model Input | FPD #1 | | FPD #2 | | PG FPD | |
| --- | --- | --- | --- | --- | --- | --- |
| | Receiving Water #1 | Receiving Water #2 | Receiving Water #1 | Receiving Water #2 | Receiving Water #1 | Receiving Water #2 |
| Amount FPD Used (gal) | 23,100 | 23,100 | 23,100 | 23,100 | 23,100 | 23,100 |
| Discharge Period (days) | 1 | 1 | 1 | 1 | 1 | 1 |
| Discharge Flow Rate (cfs) | 20 | 20 | 20 | 20 | 20 | 20 |
| Discharge Ultimate BOD (mg/l) | 1500 | 1500 | 1500 | 1500 | 1500 | 1500 |
| $BOD_5$ Load (lbs/day) | 82,440 | 82,440 | 82,440 | 82,440 | 82,440 | 82,440 |
| Receiving Water Upstream Flow Rate (cfs) | 100 | 0 | 100 | 0 | 100 | 0 |
| earn Ultimate BOD (mg/l) | 30 | 0 | 30 | 0 | 30 | 0 |
| Receiving Water Width (ft) | 130 | 15 | 130 | 15 | 130 | 15 |
| Receiving Water Depth (ft) | 8 | 1.5 | 8 | 1.5 | 8 | 1.5 |
| Receiving Water Velocity (ft/s) | .115 | .889 | .115 | .889 | .115 | .889 |
| Reaeration Rate @ 6 deg. C (1/day) | .14 | 6.76 | .14 | 6.76 | .14 | 6.76 |
| Deoxygenation Rate @ 6 deg. C. (1/day) | .05 | .05 | .005 | .005 | .04 | .04 |

Figure 2:
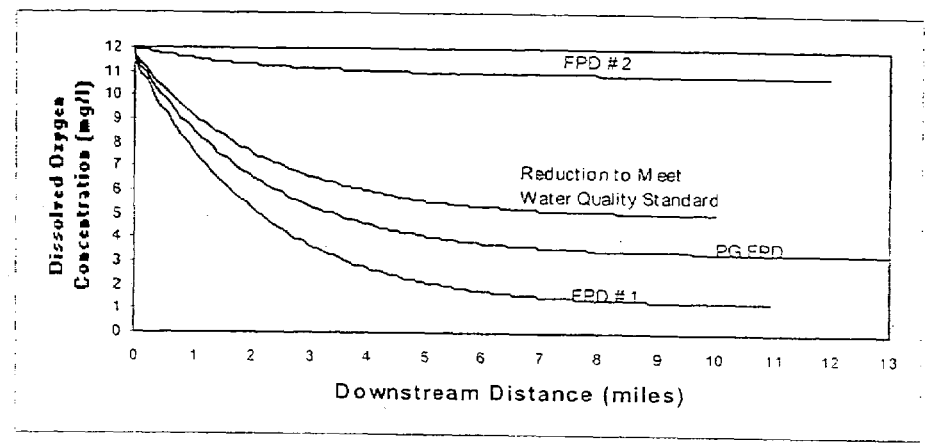
FIG. 2 shows receiving water #1 (small, slow moving stream), time=7 days.
Figure 3:
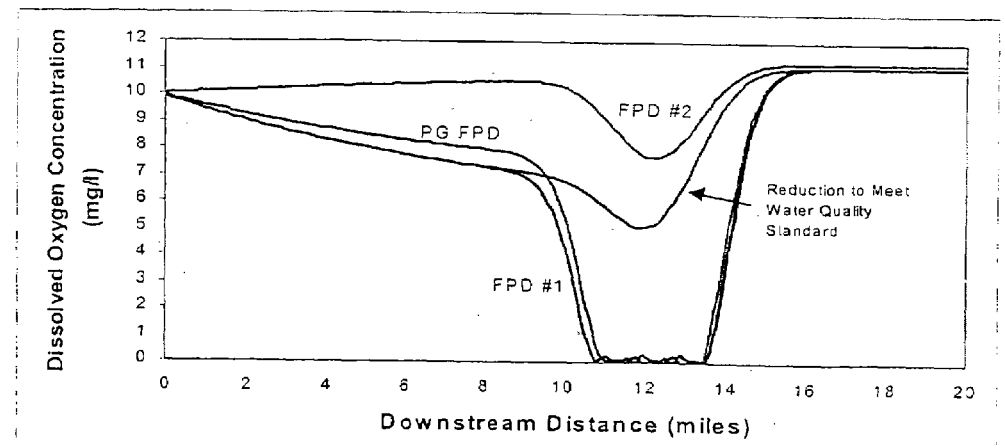
FIG. 3 shows receiving water #2: large, rapid-moving stream, t=1 day.
Figure 4:
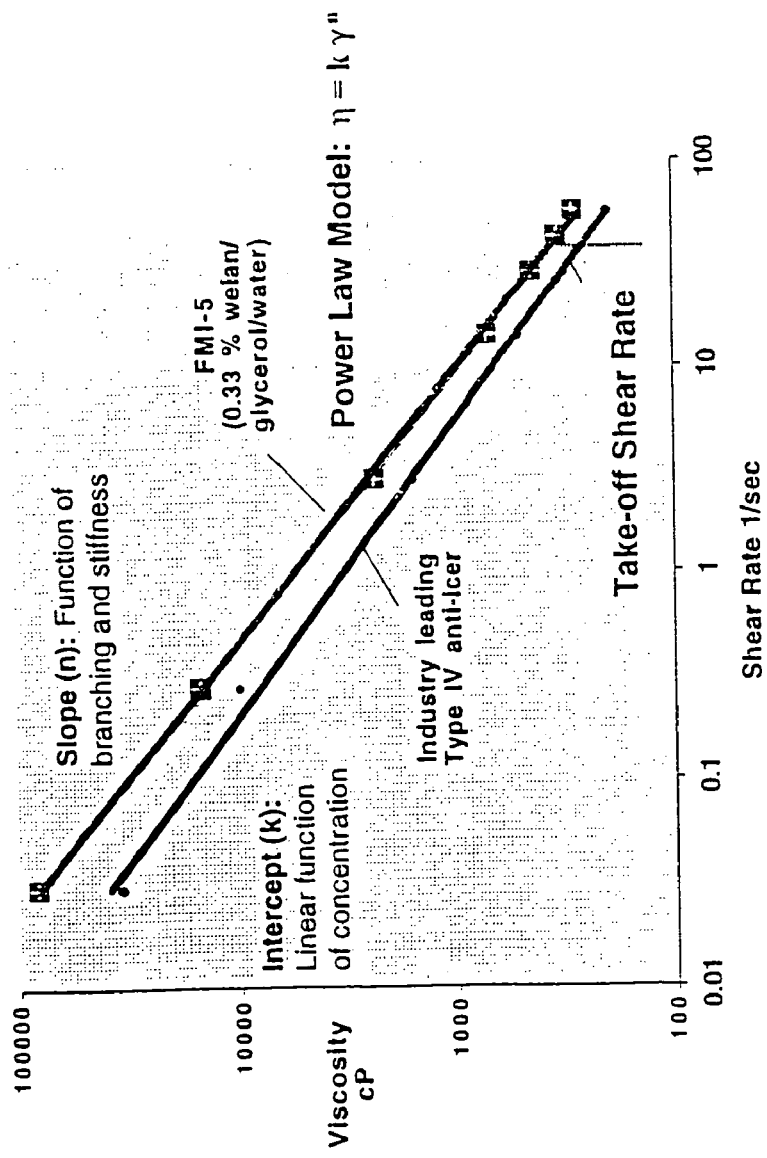
FIG. 4 shows rheological behavior of FMI-5 compared with an industry leading Type IV anti-icer.
Figure 5:
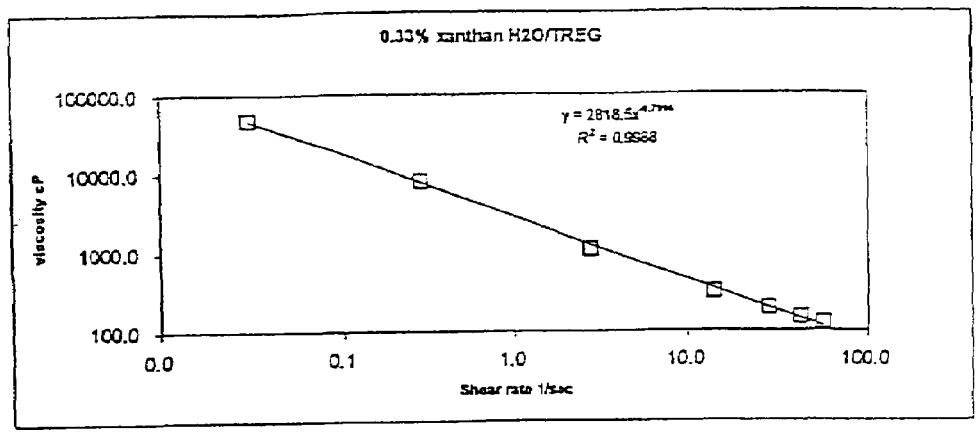
FIG. 5 shows rheological data for formulation FM-1, 0.33 weight percent xanthan gum/50:50 ethylene dioxyethanol: water (ethylene dioxyethanol is commonly known as triethylene glycol)
Figure 6:
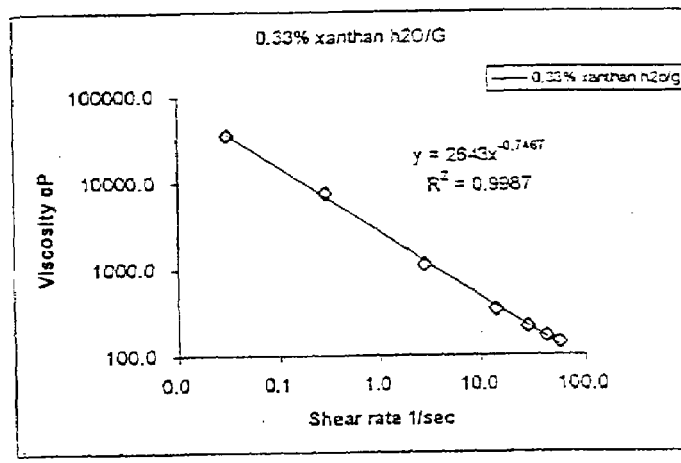
FIG. 6 shows rheological data for formulation FM-2, 0.33 weight percent xanthan gum/50:50 glycerol:water.
Figure 7:
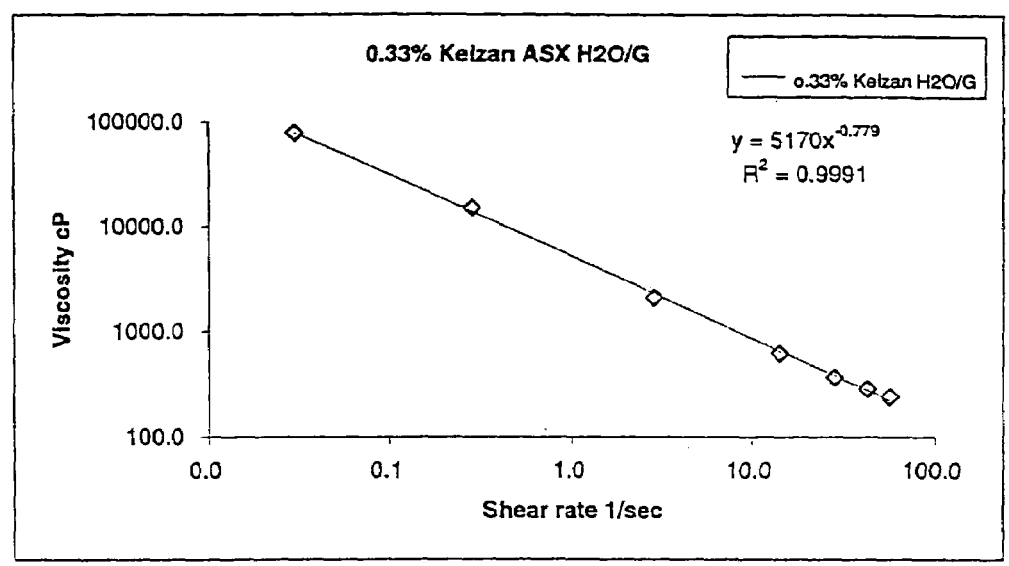
FIG. 7 shows rheological data for formulation FM-3, 0.33 weight percent clay (MHEC)/50:50 glycerol:water.
Figure 8:
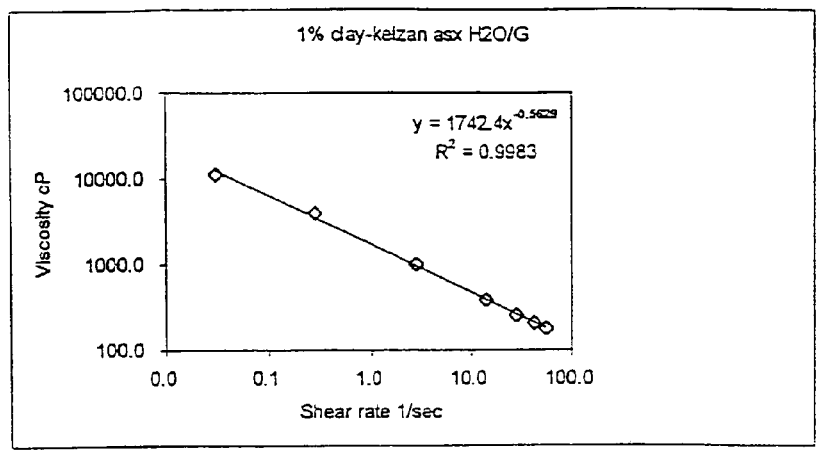
FIG. 8 shows rheological data for formulation FM-3, 1 weight percent clay (MHEC)/50:50 glycerol:water.
Figure 9:
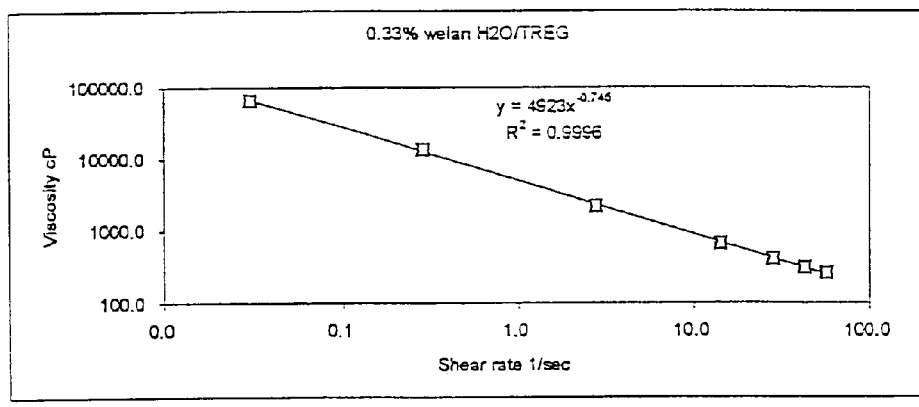
FIG. 9 shows rheological data for formulation FM-4, 0.33 weight percent welan gum/50:50 ethylene dioxyethanol: water.
Figure 10:
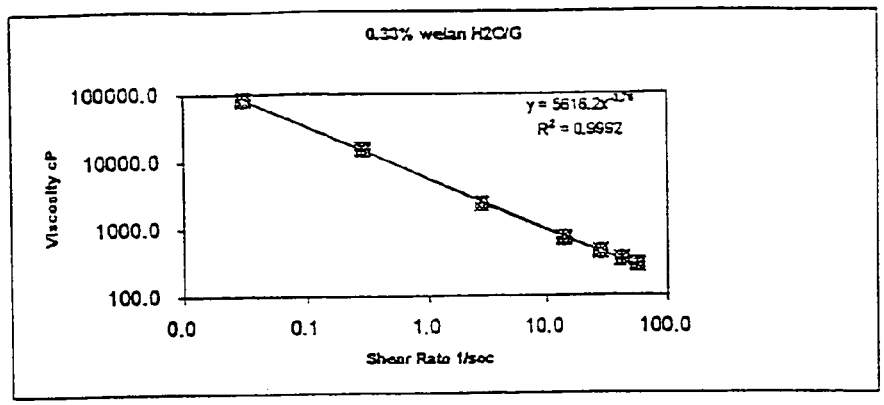
FIG. 10 shows rheological data for formulation FM-5, 0.33 weight percent welan gum/50:50 glycerol:water.
Figure 11:
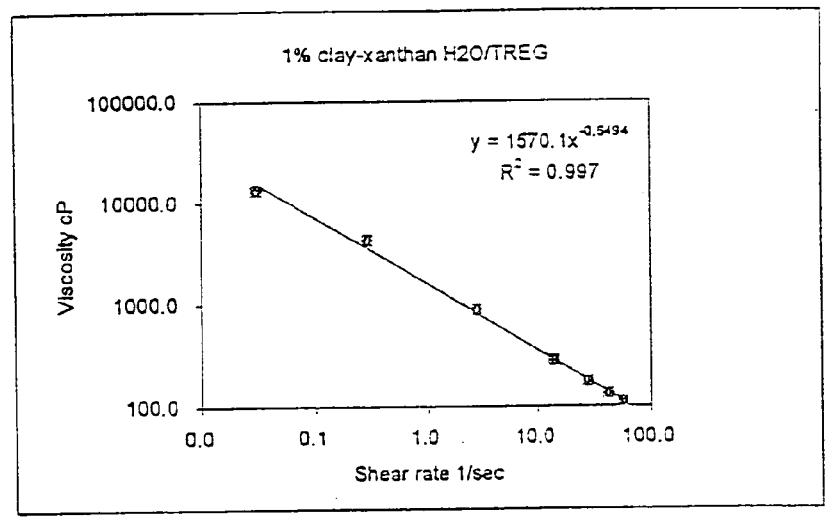
FIG. 11 shows rheological data for formulation FM-6, 1 weight percent clay-xanthan gum/50:50 ethylene dioxyethanol:water.
Figure 12:
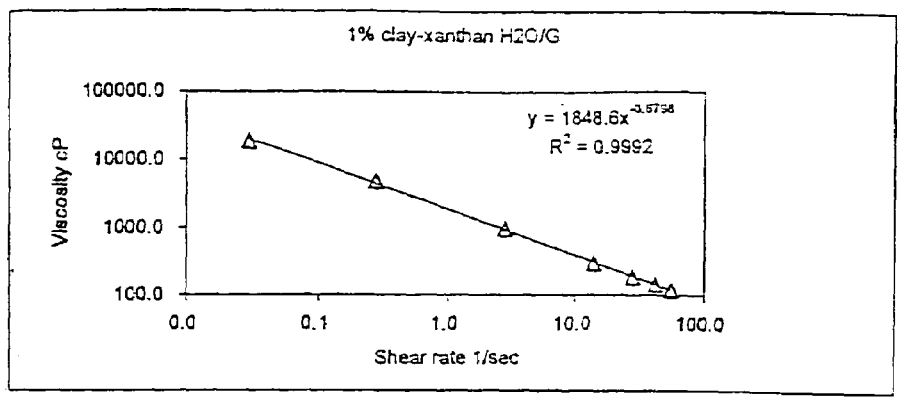
FIG. 12 shows rheological data for formulation FM-7, 1 weight percent clay-xanthan gum/50:50 glycerol:water.
Figure 13:
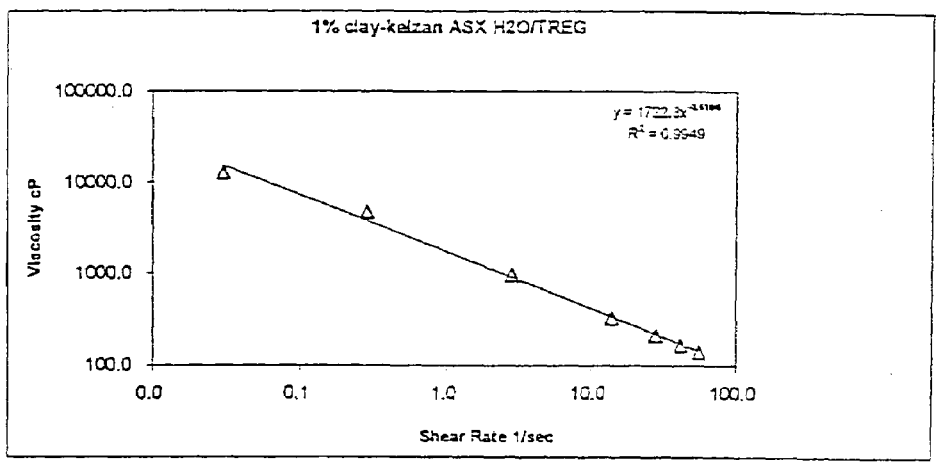
FIG. 13 shows theological data for formulation FM-8, 0.33 weight percent clay (MHEC)/50:50 ethylene dioxyethanol:water.
Figure 14:
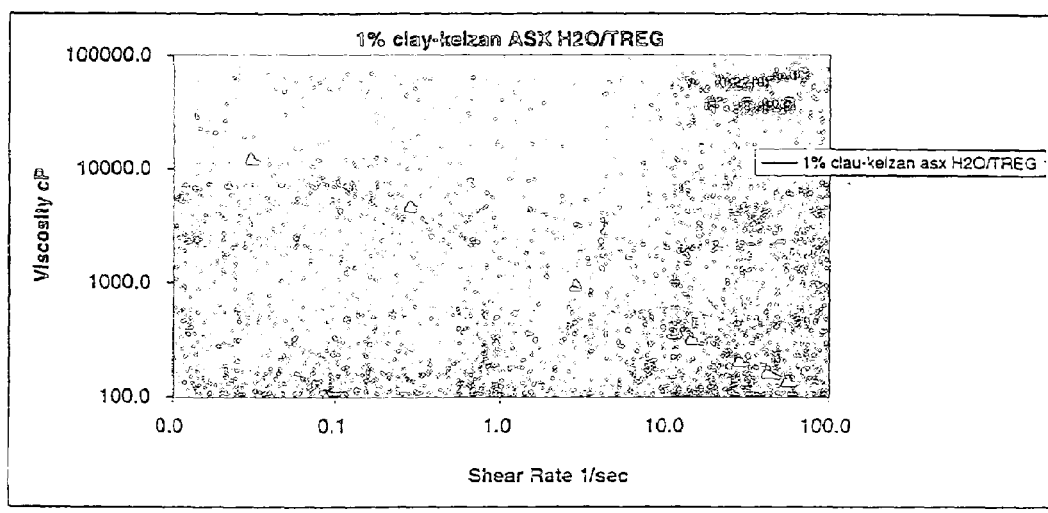
FIG. 14 shows theological data for formulation FM-8, 1 weight percent clay (MHEC)/50:50 ethylene dioxyethanol: water.

Three different freezing point depressants were analyzed in this model. "FPD #1" is a rapidly degrading FPD with degradation rate similar to glycerol. "FPD #2" is a slowly degrading FPD with degradation rate similar to triethylene glycol. "PG" represents the typical degradation rate of a propylene glycol based aircraft deicing fluid. FIGS. 2 and 3 show the dissolved oxygen content in the receiving stream at a given point in time as a function of downstream distance from the fluid's point of entry into the stream. These figures show that dissolved oxygen reaches a minimum at some point in time, i.e., a "sag point", after discharge. During this period of time, the fluid will have traveled some distance downstream. If the magnitude of this sag is such that dissolved oxygen dips below the critical level needed to maintain life, aquatic organisms may experience asphyxiation. Typical regulatory guidelines call for minimum dissolved oxygen concentrations of 5 mg/L. This level is illustrated on the graphs.

The results of the modeling show that in order to limit the magnitude of the dissolved oxygen sag in the receiving water, a slowly degrading ice control fluid is preferred. In our biodegradation experiments and in the literature, we found that triethylene glycol (TG) has a degradation rate similar to the "slow degrader" shown on the graph. Thus, a fluid rich in triethylene glycol or another slowly degrading freezing point depressant, e.g., tetraethylene glycol, is preferred for use in the present compositions, when the ice-control formulations are going to be released as runoff into the environment.

In contrast to triethylene glycol, glycerol has a degradation rate similar to the "fast degrader" shown on the graph. In fact, even though glycerol's ultimate BOD (and theoretical oxygen demand) is 27% lower than propylene glycol's ultimate BOD, the two compounds produce almost identical dissolved oxygen sag in receiving waters due to the fact that glycerol degrades more rapidly than propylene glycol, and thus exerts a larger percentage of its ultimate BOD earlier in the degradation cycle.

However, not all airports release their fluids to the environment. Some airports have built special centralized aircraft deicing facilities with dedicated systems to capture runoff from the deicing operations. These airports may biotreat this runoff, e.g., by storing it for a period of time in a lagoon or sending the runoff to a wastewater treatment facility. For these applications, an ice control formulation that degrades rapidly is desirable. Rapid degradation reduces the treatment time for the wastewater, and thus reduces the retention time and size required for the capital-intensive treatment facilities. For these applications, a fluid which has a higher percentage of glycerol, PG, or EG is preferred.

One of ordinary skill in the art can readily utilize a model, such as the one described herein, to select an appropriate FPD to obtain an ice control formulation with the desired BOD.

Surfactants

Surfactants are used in deicing and anti-icing fluids to decrease the surface tension of the fluids, allowing them to spread out on the aircraft surface and evenly wet the surface. In preferred compositions of the present invention, the surfactant comprises a biodegradable, non-ionic surfactant, with low aquatic toxicity. Examples include, e.g., ethoxylated sorbitan esters, polyoxyethylene esters, alcohol ethoxylates, and alkyl polyglucosides. The amount of surfactant used in can be readily determined. Preferably, the amount of surfactant needed to lower the surface tension of the solution is up to about 0.4 wt % surfactant.

Surfactants by their very nature can have toxic effects on aquatic organisms. They can coat surfaces or membranes required for the organism's oxygen exchange with the environment. Thus, it is advantageous for surfactants to degrade rapidly in the environment once their useful purpose has been served. Preferred surfactants for use in the present formulations have low aquatic toxicity (Table 4) and are biodegradable (see FIG. 2). Preferably they are soluble or dispersible in water, so that they form homogenous solutions or mixtures with the FPD/water mixtures in the fluid. Also it is preferred that the surfactant reduces the surface tension of the fluid below 35 dynes/cm (see surface tension, Table 6).

TABLE 6

Surface tension of various mixtures and water.

| Mixture | Surface Tension (dynes/cm) |
|---|---|
| Water | 75 |
| 89 wt % triethylene glycol/11 wt % water | 51 |
| 89 wt % triethylene glycol/11 wt % water/0.4 wt % ethoxylated sorbitol ester | 34 |

Additives

Additives are optionally added to ice control substances to enhance performance or meet specific user requirements. Examples of additives include, but are not limited to, corrosion inhibitors, dyes and buffers. Corrosion inhibitors may be required to allow the fluid to meet stringent corrosivity requirements. The fluid must not be corrosive to aircraft metals, including aluminum, titanium, magnesium, and steel alloys. Dyes are added to deicers and anti-icers in order to aid the user in determining the type of fluid being applied and to enhance the visibility of the fluid on the aircraft wing. Some formulations have additives that are sensitive to the pH level of the fluid (i.e. they only work within certain pH ranges) or have additives that change the pH of the fluid to unacceptable levels. These fluids require a pH-buffering additive.

Additives are present in aircraft deicing and anti-icing fluids in small concentrations (representing less than 2% by weight of the total fluid). Thus, even if they are biodegradable, they do not contribute significantly to the BOD of the fluid. However, additives are a primary source of aquatic toxicity in current state-of-the-art deicing and anti-icing fluids. The aquatic toxicity of pure ethylene or propylene glycol is approximately one order of magnitude lower than the aquatic toxicity of a fully formulated deicing fluid containing ethylene or propylene glycol. The aquatic toxicity of the corresponding ethylene or propylene glycol based anti-icer is about two orders of magnitude greater than the pure freezing point depressant. [Kent, Andersen, et al, "Canadian Water Quality Guidelines for Glycols—An Ecotoxicological Review of Glycols and Associated Aircraft Anti-Icing and Deicing Fluids", p. 488, FIG. 2]. An Air Force Institute of Technology (AFIT) study [Cornell, Jeffrey, David Pillard and Mark Hernandez, "Comparative Measures of Component Chemicals in Aircraft Deicing Fluid"] showed similar results. In this study, pure propylene glycol had LC50 values for fathead minnows of about 35,000 mg/L. A combination of PG plus tolytriazole (TTZ; the most toxic corrosion inhibitor in commercially available fluids) yielded an LC50 of about 5000 mg/L. The combination of PG plus the additive package for the commercially available fluid (not including TTZ) had an LC50 of about 1000 mg/L for fathead minnows, and the fully formulated anti-icing fluid had an LC50 of around 1000 mg/L. These results indicate that additives control the aquatic toxicity of the fluid, and that additives found only in anti-icing fluids are more toxic than those in deicing fluids. Thickeners and specific surfactants may be added to anti-icers and may be the source of this added toxicity.

Some additives may also represent a human or mammalian toxicity threat. For example, tolytriazole (TTZ) is used in commercially available fluids. TTZ is highly toxic to humans and persists in the environment (it is not biodegradable). It has been discovered in groundwater near an airport in Bellingham, Wash. Some surfactants are also suspected of having toxic effects on humans. Alkyl phenol ethoxylates (APE's) are popular non-ionic surfactants that may be present in some commercially available fluids. APE's break down into alkyl phenols in the environment. Alkyl phenols are endocrine disrupting compounds and they persist in the environment (i.e. they do not readily degrade). They mimic the activity of estrogen in the human body and are suspected reproductive toxins and may be linked to breast cancer. [reference: Warhust, A. Michael, "An Environmental Assessment of Alkylphenol Ethoxylates and Alkylphenols", published by Friends of the Earth, Scotland, January 95]

Thickener

The anti-icing compositions of the present invention further comprise a non-Newtonian thickener. A non-Newtonian thickener can be added to the fluid to increase its viscosity at rest. This allows the fluid to stick to vertical or inclined surfaces without running off. The fluid must remain on these surfaces until the aircraft takes off in order to provide protection against incoming frozen or freezing precipitation.

An effective anti-icing fluid contributes to source reduction. Releasing less material to the environment directly impacts both BOD and toxicity concerns, since concentrations of the material in the receiving water will be reduced. The waste associated with runoff of deicing fluid accounts for 70 to 90 percent of the deicing fluid used on the aircraft.

One approach to minimizing the environmental impact of anti-icers is to develop an extended holdover time anti-icing fluid. The performance of an extended holdover time anti-icing fluid is largely determined by the non-Newtonian thickening agent. The ideal thickening agent will have very high viscosity at rest, and yet it will thin out to a low viscosity when it is sheared. Major aircraft anti-icing fluid manufacturers have dedicated considerable technical resources to developing improved thickening agents for increased holdover time fluids. The state-of-the-art SAE "Type IV" fluids on the market have holdover times in freezing drizzle on the order of one hour and in high humidity conditions on the order of days. Use of fluids with holdover times equivalent to or better than Type IV fluids offers substantial safety and source reduction benefits. Studies of thickening agents, in particular polysaccharides, have indicated that complex structural interactions at the molecular level are responsible for their shear-thinning behavior. A molecular structural modeling approach was used to guide the selection of existing compounds in order to develop new anti-icing fluid formulations with improved rheological characteristics.

Traditionally, commercial fluid suppliers have obtained longer holdover times at an environmental cost: anti-icing fluids have aquatic toxicity values that are orders of magnitude higher than their deicing fluid counterparts. Thus, it is desirable to have anti-icing fluids that are environmentally friendly.

An ideal thickening agent for an anti-icer fluid has a low flow behavior index, n, where flow behavior index is defined by the following equation:

$$\eta = K\gamma^{n-1}$$

where $\eta$ is the measured viscosity or shear stress (in cP), $\gamma$ is the applied shear rate (in sec$^{-1}$), and K and n are constants for a specific thickening agent in a given solution.

The power law equation shown above is widely used as a model for non-Newtonian fluids. It holds for many polymer solutions and, depending on the value of the power factor n (also called the flow behavior index), it describes Newtonian, shear-thinning, and shear-thickening behavior. For a Newtonian fluid, n=1 and the equation reduces to the Newtonian model, where the viscosity is constant with respect to the shear rate. If n<1, the fluid is considered to be shear thinning; if n>1 the fluid is shear thickening. To determine whether the power law applies and to determine the value of n, the log shear stress is plotted as a function of the log shear rate. If the plot is linear on the log-log plot, the power law applies, and the value of n, which is related to the slope of the line, can be used as a measure of the degree of shear thinning or shear thickening. Fluids with a low flow behavior index, n, will have a steep negative slope on the log viscosity versus log shear rate curve. This indicates a large decrease in viscosity as a function of shear. A high intercept ("K") is also desirable for an anti-icing fluid. This number represents the low shear viscosity of the fluid. Fluids with high K values can withstand shearing forces due to gravity and light winds without flowing. Thus, these fluids will remain on the aircraft and provide protection against icing while the aircraft is at rest.

Thus, preferred thickeners for use in the anti-icers of the present invention have higher K values, i.e., from about 500 to about 25,000, and low behavior index, n, i.e., from about –0.40 to about 0.80. These values can readily be determined by one of ordinary skill in the art in accordance with the above equation.

The thickener's rheological properties play a primary role in determining the thickness of the fluid film formed by spraying the fluid on an aircraft wing, and the relative amount of fluid that remains present on an inclined surface over a period of time.

We conducted a simple test devised to determine the propensity of the fluid to remain on an aluminum plate held vertically. The test results indicated that the thickness of the protective coating of anti-icer that remains on the surface is largely a function of the low shear fluid viscosity, which is controlled by thickener concentration and the rheological properties of the thickener in the fluid.

We determined the "K" and "n" parameters experimentally using a Brookfield viscometer for various combinations of polysaccharide thickening agents and freezing point depressants. Examples of polysaccharide thickeners include welan gum, xanthan gum, locust bean gum, pectin, guar gum, and tracaganth. Based on this data, we determined that welan gum and xanthan gum had similar rheological properties, and that these properties were most suitable for the anti-icing fluid application (see Table 7, Rheological Properties of Aqueous Solutions of Polysaccharides and Freezing Point Depressants.) However, the anti-icing fluid must also be able to retain these properties when exposed to extremes of temperature.

TABLE 7

Rheological properties of polysaccharides in water at room temperature.

| Polysaccharide | Wt % | K | N |
| --- | --- | --- | --- |
| Pectin | 2.0 | 5.14 | 0.80 |
| Locust Bean Gum | 1.5 | 9.33 | 0.63 |
| Welan Gum | 0.5 | 7.91 | 0.30 |
| Xanthan Gum | 1.0 | 8.45 | 0.38 |

Clearly, anti-icing fluids are applied to aircraft when atmospheric temperatures are below freezing (below 0° C.). Current state-of-the-art anti-icing fluids are designed to be used at operational temperatures as low as –20° C. In general, the viscosity of a fluid increases as temperature decreases. If the anti-icing fluid's high shear viscosity (i.e. the viscosity of the fluid under a rate of shear equivalent to the wind shear experienced on the wings of an aircraft during takeoff) is too high, the fluid will fail to flow off of the wings of the aircraft on takeoff, resulting in a loss of lift and a potentially hazardous situation. Thus, a preferred thickener does not change its rheological behavior significantly over the usage temperature range of interest (from about 0° C. to –20° C.).

In addition to providing consistent low temperature rheological properties, anti-icing fluids must be able to withstand high temperature extremes without significant alteration of rheological properties. Anti-icing fluids can be exposed to elevated temperatures for long periods of time during storage over the summer months. The AMS 1428 specification therefore requires that anti-icing fluids retain 90% of their low shear viscosity value after exposure to elevated temperatures of 70° C. for 30 days. In addition, anti-icing fluids may sometimes be applied after heating to temperatures approaching 100° C. This occurs when a user decides to apply the anti-icing fluid in a one-step process, in which deicing (removal of ice already formed on a surface) is accomplished simultaneously with anti-icing (prevention of future ice formation on a surface).

Polysaccharides are generally susceptible to degradation by exposure to high temperatures. However, our experiments demonstrated that welan gum was able to meet the elevated temperature exposure requirements of AMS 1428. In contrast to Xanthan, which loses practically all of its viscosity at 135° C., welan gum can remain viscous in solutions up to 163° C. for short periods of time (25 minutes). (K. S. Kang and D. J. Pettit, "Xanthan, Welan, and Rhamsan", Chapter 13 of *Industrial Gums: Polysaccharides and Their Derivatives*, Whistler and BeMiller, ed., p. 383). Xanthan loses about 40% of its viscosity when heated to 212° F. (100° C.) while welan only loses about 10% of its viscosity. (Kang and Pettit, FIG. 27 on p. 382).

While any known thickener having the desired characteristics can be used in the anti-icing formulations of the present invention, welan gum is a preferred thickener. Welan gum provides excellent rheological characteristics and is unusually thermally stable. Thermal stability test using the methods described in the AMS 1428 specification, showed that welan gum met the anti-icer specification requirement (i.e., neither losing less than 20% of its viscosity nor gaining more than 10% after 30 days of exposure to 70° C.)

Although xanthan's rheological properties were similar to those of welan gum prior to elevated temperature exposure, formulations containing xanthan lost about 30% of their viscosity after exposure to 70° C. for 30 days (see Table 3, Thermal Stability Testing of Polysaccharide Thickened Fluids). Even forms of xanthan that have been altered to provide additional thermal stability were incapable of meeting this requirement. Thus, welan gum is clearly the preferred polysaccharide for this application.

TABLE 8

Thermal Stability Testing of Polysaccharide Thickened Fluids. Change in viscosity after fluid was exposed to temperature of 70° C. for 30 days.

| Formulation | % viscosity change at shear rate = 2.8 sec$^{-1}$ | % viscosity change at shear rate = 14.0 sec$^{-1}$ | % viscosity change at shear rate = 56.0 sec$^{-1}$ |
|---|---|---|---|
| 0.33 wt % welan in 1:1 water/triethylene glycol solution* | −17 | −12 | −26 |
| 0.33 wt % welan in 1:1 water/glycerol solution* | +4 | −6 | −13 |
| 0.33 wt % xanthan in 1:1 water/triethylene glycol solution* | −85 | −61 | −38 |
| 0.33 wt % xanthan in 1:1 water/glycerol solution* | −95 | −85 | −62 |
| 0.33 wt % thermally stable xanthan in 1:1 water/triethylene glycol solution | −29 | −27 | −30 |
| 0.33 wt % thermally stable xanthan in 1:1 water/glycerol solution | −88 | −71 | −60 |

*= average of measurements from two replicate samples.

In other embodiments, the thickener includes combinations of polysaccharides and clays. In preferred embodiments, the clay is treated, e.g., hydrophobically modified. Appropriate clays can readily be selected by one of ordinary skill in the art. Examples of useful clays include suspensions of small particles of clay, including types of clay classified as montmorillinite (also sometimes referred to as smectite clays, and include clays referred to as hectorite, bentonite, and montmorillinite), illite, and attapulgite. The preferred clay is a montmorillinite clay. In one embodiment, the clay is purified montmorillonite clay (NANO No. 73, lot No. AN-237-97, from Nanocore, Inc.).

Examples of the polysaccharides that are combined with the clays include those described above, e.g., welan gum, xanthan gum, and other known in the art.

The present invention is further illustrated by the following Examples. The Examples are provided to aid in the understanding of the invention and are not construed as a limitation thereof.

All the deicing fluid compositions set forth in the following examples are made by thoroughly blending ingredients together at room temperature. Anti-icing fluid compositions . . . . Marina should supply a paragraph explaining how she dispersed the welan gum in the mixture since it is not completely straightforward.

EXAMPLE 1

Composition of Slowly Degrading (Low 5-Day BOD) Deicing Fluid

The following components are mixed together:

| | |
|---|---|
| Triethylene glycol | 99.6 wt % |
| PEG-20 sorbitan oleate | 0.4 wt % |

EXAMPLE 3

Composition of Deicing Fluid with More Rapid Degradation (Higher 5-Day BOD) than Example 1

The following components are mixed together:

| | |
|---|---|
| Triethylene glycol | 74.3 wt % |
| Glycerol | 24.3 wt % |
| PEG-20 sorbitan oleate | 0.4 wt % |

EXAMPLE 4

Composition of Deicing Fluid with More Rapid Degradation (Higher 5-Day BOD) than Example 3

The following components are mixed together:

| | |
|---|---|
| Triethylene glycol | 74.3 wt % |
| Glycerol | 24.3 wt % |
| PEG-20 sorbitan oleate | 0.4 wt % |

EXAMPLE 5

Composition of Deicing Fluid with More Rapid Degradation (Higher 5-Day BOD) than Example 4

The following components are mixed together:

| | |
|---|---|
| Triethylene glycol | 49.3 wt % |
| Glycerol | 49.3 wt % |
| PEG-20 sorbitan oleate | 0.4 wt % |

EXAMPLE 6

Composition of Biotreatable Deicing Fluid

The following components are mixed together:

| | |
|---|---|
| Glycerol | 99.6 wt % |
| PEG-20 sorbitan oleate | 0.4 wt % |

EXAMPLE 7

Composition of Biotreatable Deicing Fluid with Improved Flow and Handling Characteristics The following components are mixed together:

| | |
|---|---|
| Glycerol | 74.6 wt % |
| Water | 25.0 wt % |
| PEG-20 sorbitan oleate | 0.4 wt % |

EXAMPLE 8

Composition of Slowly Degrading (Low 5-Day BOD) Anti-Icing Fluid

The following components were mixed together.

| | |
|---|---|
| Triethylene glycol | 57.6 wt % |
| Water | 41.8 wt % |
| Welan gum | 0.2 wt % |
| PEG-20 sorbitan oleate | 0.4 wt % |

EXAMPLE 9

Composition of Anti-Icing Fluid with More Rapid Degradation (Higher 5-Day BOD) than Example 8

The following components were mixed together.

| | |
|---|---|
| Triethylene glycol | 43.2 wt % |
| Glycerol | 14.4 wt % |
| Water | 41.8 wt % |
| Welan gum | 0.2 wt % |
| PEG-20 sorbitan oleate | 0.4 wt % |

EXAMPLE 10

Composition of Anti-Icing Fluid with More Rapid Degradation (Higher 5-Day BOD) than Example 9

The following components are mixed together.

| | |
|---|---|
| Triethylene glycol | 28.8 wt % |
| Glycerol | 28.8 wt % |
| Water | 41.8 wt % |
| Welan gum | 0.2 wt % |
| PEG-20 sorbitan oleate | 0.4 wt % |

EXAMPLE 11

Composition of Anti-Icing Fluid with More Rapid Degradation (Higher 5-Day BOD) than Example 10

The following components are mixed together.

| | |
|---|---|
| Triethylene glycol | 14.4 wt % |
| Glycerol | 43.2 wt % |
| Water | 41.8 wt % |
| Welan gum | 0.2 wt % |
| PEG-20 sorbitan oleate | 0.4 wt % |

EXAMPLE 12

Composition of Biotreatable Anti-Icing Fluid

The following components are mixed together.

| | |
|---|---|
| Glycerol | 57.6 wt % |
| Water | 41.8 |
| Welan gum | 0.2 wt % |
| PEG-20 sorbitan oleate | 0.4 wt % |

EXAMPLE 13

Composition of Anti-Icing Fluid Thickened with Welan Gum and Hydrophobically Modified The following components are mixed together.

| | |
|---|---|
| Triethylene glycol | 43.2 wt % |
| Glycerol | 14.4 wt % |
| Water | 41.0 wt % |
| Clay/MeHEC | 1.0 wt % |
| PEG-20 sorbitan oleate | 0.4 wt % |

These compositions can be prepared as a concentrate and then diluted by the user as needed for the particular use or method of application.

EXAMPLE 14—USE OF CLAY AS A THICKENER

Figure 16:
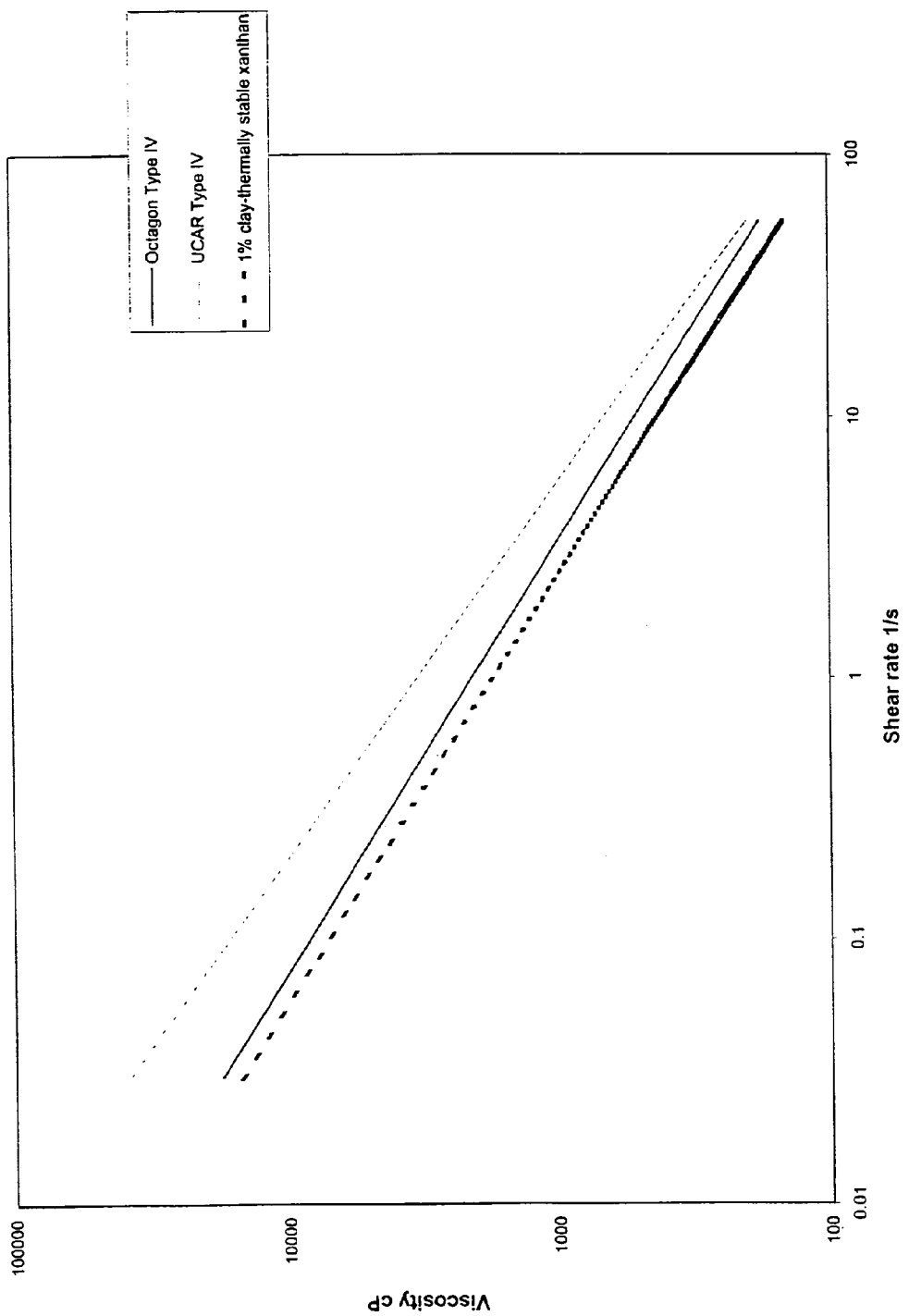
FIG. 16 shows the rheological behavior (viscosity versus shear rate, on a logarithmic scale) of a 10% clay/thermally stable xanthan mixture in a 1:1 solution (by weight) of triethylene glycol and water compared with OCTAGON Type IV and UCAR Type IV.
Figure 17:
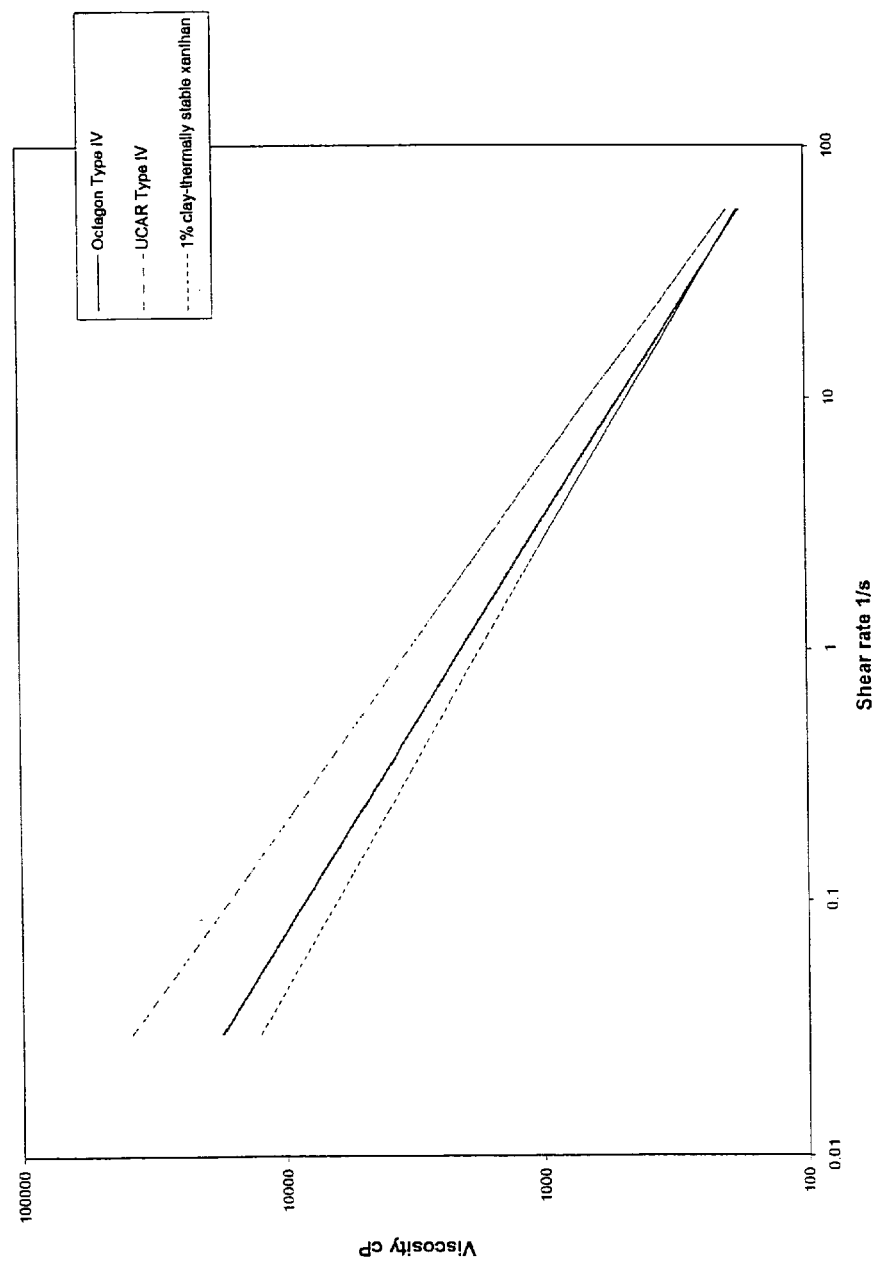
FIG. 17 shows the theological behavior of a 1% clay/thermally stable xanthan mixture in a 1:1 solution (by weight) of glycerol and water compared with OCTAGON Type IV and UCAR Type IV.
Figure 18:
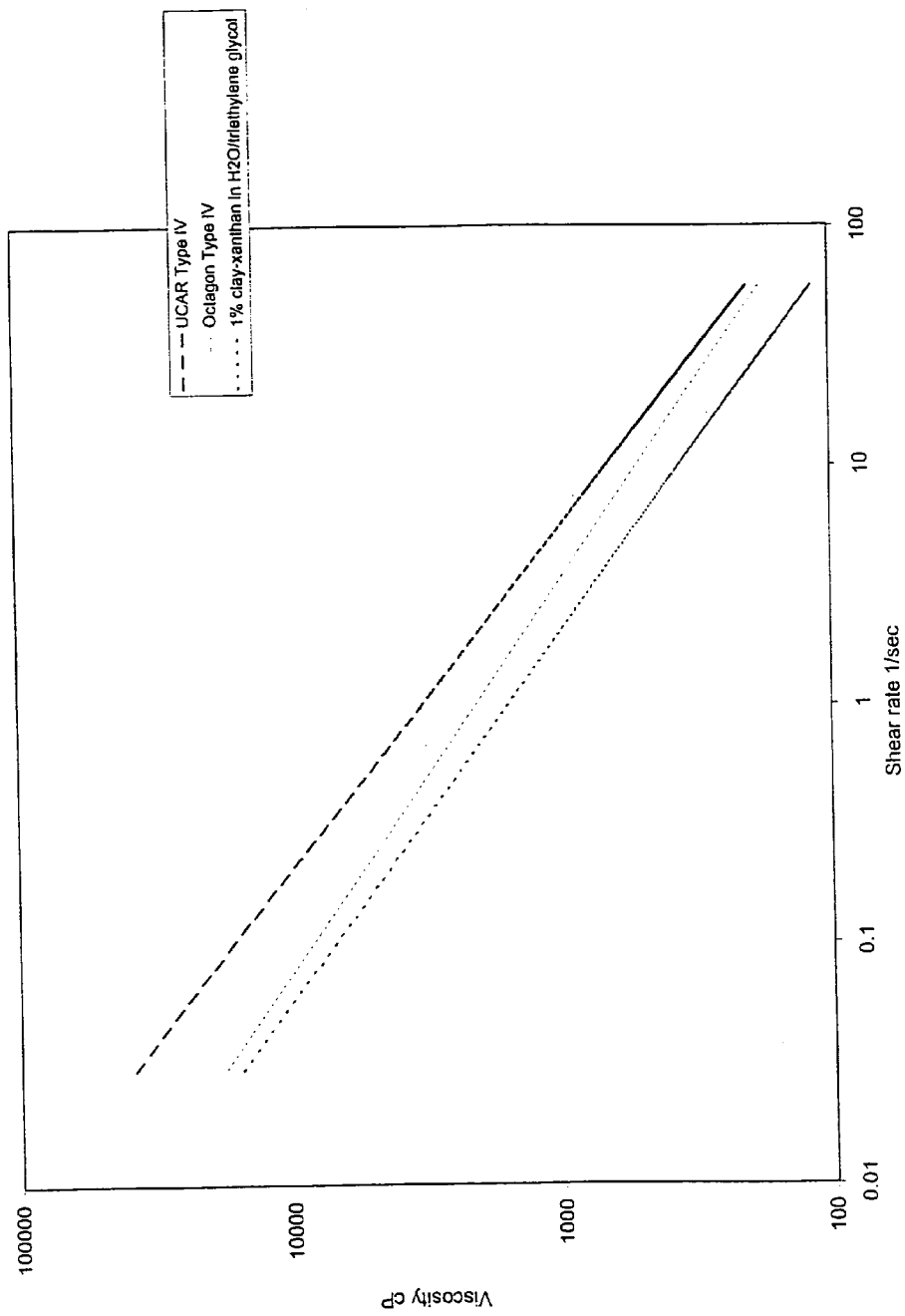
FIG. 18 shows the rheological behavior of a 1% clay/xanthan mixture in a 1:1 solution (by weight) of triethylene glycol and water compared with OCTAGON Type IV and UCAR Type IV.

It was found that a specific treatment of purified montmorillonite clay (NANO No. 73, lot No. AN-237-97, from Nanocore, Inc.) by hydrophobically modified cellulose results in a shear-thinning characteristics which are comparable with xanthan and welan gums and commercially available Type IV anti-icing fluid. Purified montmorillonite clay obtained from Nanocor Inc. (Chicago, Ill.) was treated with commercially available methyl-2-hydroxyethylcellulose (MeHEC) as follows: a 30 weight percent suspension of clay in water was mixed with MeHEC powder, resulting in a powder. This powder was dissolved in water. The resulting solution was mixed with a freezing point depressant (triethylene glycol or glycerol) to yield a 50:50 composition (50 wt % water plus clay/MeHEC, 50 wt % FPD). The rheology of various concentrations of clay/MeHEC, mixtures of clay/MeHEC with xanthan gum, and MeHEC alone in the FPD/water solution were measured. Comparison was made to the commercially available Type IV fluids, both at ambient temperature and at 0° C. When clay/MeHEC was added at a concentration of about 1 wt % to freezing point depressant/water solutions, its rheological properties were similar to those of a commercially available Type IV fluid. See FIGS. 16-18.

Table 9 lists some anti-icing formulations containing a freezing point depressant (glycerol or ethylene dioxyethanol, commonly known as triethylene glycol) and a thickening agent(s) (xanthan gum, welan gum, clay and clay treated with methyl-2-hydroxyethylcellulose (MeHEC)). The FPDs have about a 27 to 50 percent lower 20 day, room temperature BOD than the glycols and have rheological characteristics comparable to commercially available anti-icing fluids. The concentrations of the freezing point depressant (FPD) in water range from 20 to 80 percent, while the concentration of the thickening agent ranges from 0 to 3 percent. FIGS. 5 through 14 show the rheological characteristics (viscosity vs shear rate) for each of the anti-icing formulations at room temperature (25° C.) listed in Table 9 for illustrative values of the freezing point depressant concentration and thickening agent concentration.

TABLE 9

Anti-icing formulations

| Formula | FPD | Thickener |
|---|---|---|
| FMI-1 | Ethylene dioxyethanol | Xanthan |
| FMI-2 | Glycerol | Xanthan |
| FMI-3 | Glycerol | Clay/MHEC |
| FMI-4 | Ethylene dioxyethanol | Welan gum |
| FMI-5 | Glycerol | Welan gum |
| FMI-6 | Ethylene dioxyethanol | Clay/xanthan |
| 10FMI-7 | Glycerol | Clay/xanthan |
| FMI-8 | Ethylene dioxyethanol | Clay/MHEC |

A series of experiments was performed in a study of rheological properties of 1 percent MeHEC and 1 percent clay treated with MeHEC at ambient temperature and 0° C. in order to formulate an anti-icing fluid. A rheology modifier was dissolved in water. The resulting solution was mixed with freezing point depressant (ethylene dioxyethanol or glycerol) to yield a 50:50 composition. Comparison was made to the commercially available UCAR and Octagon Type IV anti-icing fluids, 0.5 percent xanthan gum, 0.5 percent welan gum, and untreated 1 percent MeHEC in water/ethylene dioxyethanol and in water/glycerol mixtures, both at ambient temperature and at 0° C.

It was found that cellulose-treated clay in a water/ethylene dioxyethanol mixture showed rheological characteristics similar to UCAR Type IV anti-icing fluid, 0.5 percent xanthan gum, and 0.5 percent welan gum. The viscosity of cellulose-treated clay in water/glycerol mixture was lower. This parameter can be improved by changing the percentage of modified cellulose in the clay composition or by increasing the concentration of the clay. Since the temperature effects in an anti-icing fluid should be minimal, the temperature effect (expressed as a ratio of viscosity at corresponding temperatures) was studied. The cellulose-treated clay exhibited the lowest temperature-thinning effect in water/ethylene dioxyethanol and in water/glycerol mixtures. The effect was similar to the one of UCAR and xanthan gum. At the same time untreated 1 percent MeHEC in water/ethylene dioxyethanol and in water/glycerol mixture showed the highest temperature-thinning effect. The highest shear-thinning effects were observed in xanthan gum and welan gum in water/glycerol, but the shear-thinning effect in clay-cellulose mixture was similar to UCAR Type IV.

The flow index of the MeHEC-treated clays was comparable to the one of UCAR TYPE IV as well as xanthan gum. On the other hand, the flow index of the untreated MeHEC was by far higher, indicating substantial improvement in the shear thinning.

Figure 15:
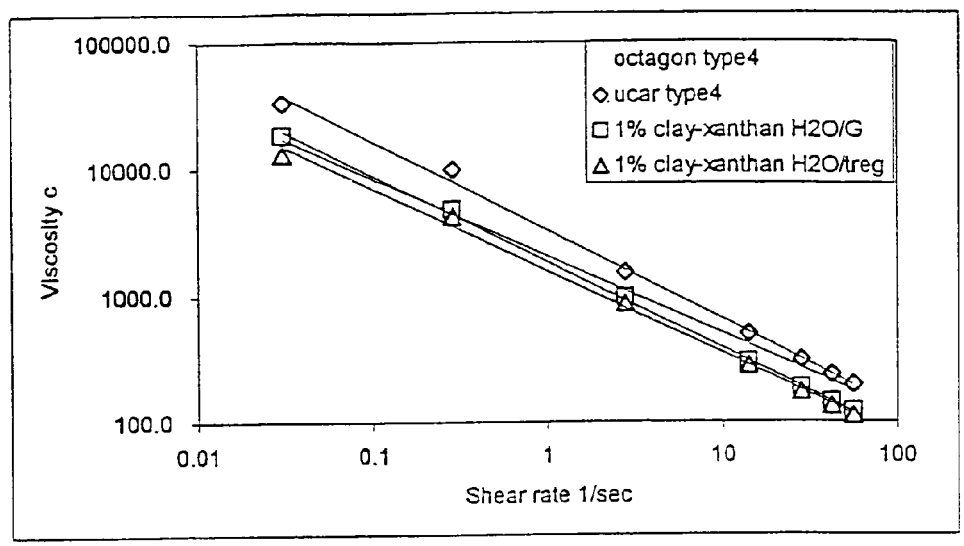
FIG. 15 shows a comparison of the rheological data for formulations FM-6 and FM-7, 1 weight percent clay-xanthan gum/50:50 ethylene dioxyethanol or glycerol:water.

In summary, it appears that a 1 percent clay treated with MeHEC and mixed with xanthan gum in a water/propylene glycol and in a water/ethylene dioxyethanol mixture possesses rheological characteristics comparable to UCAR TYPE IV anti-icing fluid and some gums (see FIG. 15).

EXAMPLE 14

The Following Anti-Icing Compositions were Made

FM-1A: 0.22 g of welan gum (lot #913914K) obtained from Monsanto was dispersed in 42.2 g DI water. 0.2 g of surfactant Emerest 2660 (PEG-12-oleate (Cognis) was dissolved in the dispersion followed by mixing with 57. 38 g of triethyleneglycol (TREG) (Aldrich).

FM-2A: 0.22 g of welan gum (lot #913914K) obtained from Monsanto was dispersed in 42.2 g DI water. 0.2 g of surfactant Emsorb 6900 (PEG-20-sorbitan oleate) (Cognis) was dissolved in the dispersion followed by mixing with 43.04 g of triethyleneglycol (Aldrich) and 14.34 g glycerol (Aldrich).

FM-3A: 0.33 g welan gum (lot #913914K) obtained from Monsanto was dispersed in 42.16 g DI water. 0.2 g of surfactant Emsorb 6900 (Cognis) was dissolved in the dispersion followed by mixing with 57.3 µg of triethyleneglycol (Aldrich).

FM-4A: 0.33 g welan gum (lot #913914K) obtained from Monsanto was dispersed in 42.16 g DI water. 0.2 g of surfactant Emerest 2660 (Cognis) was dissolved in the dispersion followed by mixing with 43.0 g of triethyleneglycol (Aldrich) and 14.3 µg glycerol (Aldrich).

FM-5A: 0.22 g of welan gum (lot #913914K) obtained from Monsanto was dispersed in 42.12 g DI water. 0.4 g of surfactant Emsorb 6900 (Cognis) was dissolved in the dispersion followed by mixing with 57.27 g of triethyleneglycol (Aldrich).

FM-6A: 0.22 g of welan gum (lot #913914K) obtained from Monsanto was dispersed in 42.12 g DI water. 0.4 g of surfactant Emerest 2660 (Cognis) was dissolved in the dispersion followed by mixing with 42.96 g of triethyleneglycol (Aldrich) and 14.31 g glycerol (Aldrich).

FM-7A: 0.33 g welan gum (lot #913914K) obtained from Monsanto was dispersed in 42.07 g DI water. 0.4 g of surfactant Emerest 2660 (Cognis) was dissolved in the dispersion followed by mixing with 57.2 g of triethyleneglycol (Aldrich).

FM-8A: 0.33 g welan gum (lot #913914K) obtained from Monsanto was dispersed in 42.07 g DI water. 0.4 g of surfactant Emerest 2660 (Cognis) was dissolved in the dispersion followed by mixing with 42.9 g of triethyleneglycol (Aldrich) and 14.3 g glycerol (Aldrich).

The percentages are set forth in Table 10.

TABLE 10

Anti-icing formulations

| Name | Run | % TREG | % Glycerol | % Water | % Welan | % Emerest | % Emsorb |
|---|---|---|---|---|---|---|---|
| FM-1 | 7 | 57.38 |  | 42.20 | 0.22 | 0.20 |  |
| FM-2 | 8 | 43.04 | 14.34 | 42.20 | 0.22 |  | 0.20 |
| FM-3 | 1 | 57.31 |  | 42.16 | 0.33 |  | 0.20 |
| FM-4 | 3 | 43.00 | 14.31 | 42.16 | 0.33 | 0.20 |  |
| FM-5 | 5 | 57.27 |  | 42.12 | 0.22 |  | 0.40 |
| FM-6 | 4 | 42.96 | 14.31 | 42.12 | 0.22 | 0.40 |  |
| FM-7 | 2 | 57.20 |  | 42.07 | 0.33 | 0.40 |  |
| FM-8 | 6 | 42.90 | 14.30 | 42.07 | 0.33 |  | 0.40 |

The invention has been described in detail with particular references to the preferred embodiments thereof. However, it will be appreciated that modifications and improvements within the spirit and scope of this invention may be made by those skilled in the art upon considering the present disclosure.

The references cited herein are incorporated by reference.

We claim:

1. A deicing composition having a tailorable biochemical oxygen demand (BOD), said composition comprising:
   a) at least one first freezing point depressant (FPD) that is non-toxic, biodegradable and has a first 5 day BOD value, the at least one first FPD selected from the group consisting of triethylene glycol and tetraethylene glycol;
   b) at least one second FPD that is non-toxic and biodegradable, and has a 5 day BOD value greater than the 5 day BOD of the first FPD, the at least one second FPD selected from the group consisting of glycerol, propylene glycol, and 1,3 butanediol; and
   c) at least one surfactant, wherein the surfactant is non-ionic, non-toxic and biodegradable;
   wherein the first FPD of (a) and the second FPD of (b) are present in a ratio ranging from about 3:1 to about 1:3.

2. The composition according to claim 1, wherein the at least one first FPD comprises triethylene glycol.

3. The composition according to claim 2, wherein the second FPD comprises glycerol or propylene glycol.

4. The composition according to claim 1, wherein the surfactant comprises ethoxylated sorbitan esters, polyoxyethylene esters, ethoxylates or alkyl polyglycosides.

5. The composition according to claim 1, having a holdover time greater than about 20 minutes.

6. The composition according to claim 1, further comprising a corrosion inhibitor.

7. An anti-icing composition having a tailorable BOD, said composition comprising:
   a) at least one freezing point depressant (FPD) that is non-toxic, biodegradable;
   b) at least one surfactant, wherein the surfactant is non-ionic, non-toxic and biodegradable; and
   c) at least one thickener that is non-toxic and biodegradable and is a combination of polysaccharides and clays.

8. The composition according to claim 7, wherein the at least one FPD is selected from the group consisting of triethylene glycol, glycerol, propylene glycol, 1, 3 butanediol and tetraethylene glycol.

9. The composition according to claim 7, wherein the at least one FPD comprises triethylene glycol.

10. The composition according to claim 9, wherein the at least one FPD further comprises glycerol or propylene glycol.

11. The composition according to claim 7, wherein the at least one FPD comprises a first FPD having a certain five day BOD value, and a second FPD having a five day BOD value greater than the first FPD five day BOD value, and the ratio of first FPD to second FPD ranges from about 10:90 to about 90:10.

12. The composition according to claim 7, wherein the surfactant comprises ethoxylated sorbitan esters, polyoxyethylene esters, alcohol ethoxylates or alkyl polyglycosides.

13. The composition according to claim 7, having a holdover time of at least 20 minutes.

14. The composition according to claim 7, wherein the thickener comprises a polysaccharide.

15. The composition according to claim 7, further comprising a corrosion inhibitor.

16. A method of tailoring the biodegradability of a deicing composition having a tailorable BOD, comprising:
   a) providing at least one surfactant, wherein the surfactant is non-ionic, non-toxic and biodegradable;
   b) providing at least one non-toxic and biodegradable rapidly degrading freezing point depressant (FPD) selected from the group consisting of glycerol, propylene glycol, and 1,3 butanediol and at least one non-toxic and biodegradable slowly degrading FPD selected from the group consisting of triethylene glycol and tetraethylene glycol; and
   c) mixing the at least one surfactant, at least one rapidly degrading FPD, and at least one slowly degrading FPD, such that the ratio of the at least one rapidly degrading FPD to the at least one slowly degrading FPD provides a composition that has a five day biochemical oxygen demand (BOD) ranging from 40 g/kg to 840 g/kg.

17. A process for anti-icing or deicing an exterior surface of an aircraft, comprising applying to the exterior of the aircraft a deicing composition having a tailorable BOD, comprising:
   a) at least one first freezing point depressant (FPD) that is non-toxic, biodegradable and has a certain rate of degradation;
   b) at least one second FPD that is non-toxic, biodegradable, and has a rate of degradation that is different from the rate of degradation of the first FPD;
   c) at least one surfactant, wherein the surfactant is non-ionic, non-toxic and biodegradable; and
   d) at least one thickener comprising combinations of polysaccharides and clays.

18. A slow degrading ice control formulation having a tailorable BOD, comprising
   a) about 50-99.9% of a slow degrading freezing point depressant, that is non-toxic and biodegradable;
   b) about 0.1-1.0% of a biodegradable, non-ionic surfactant, and
   c) about 0.1-50% of a rapidly degrading freezing point depressant that is non-toxic and biodegradable
   wherein the slow degrading freezing point depressant and the rapidly degrading freezing point depressant are present in a ratio that provides a five day biochemical oxygen demand (BOD) ranging from about 40 g&/kg to about 840 g/kg.

19. The ice control formulation according to claim 18, wherein the slow degrading freezing point depressant comprises triethylene glycol.

20. The ice control formulation according to claim 18, wherein the rapidly degrading freezing point depressant comprises glycerol.

21. The ice control formulation according to claim 19, wherein the surfactant comprises ethoxylated sorbitan esters, polyoxyethylene esters, alcohol ethoxylates or alkyl polysaccharides.

22. The ice control formulation according to claim 18, further comprising a non-toxic and biodegradable thickener.

23. The ice control formulation according to claim 22, wherein the thickener comprises a polysaccharide.

24. The ice control formulation according to claim 23, wherein the thickener further comprises clay.

25. The ice control formulation according to claim 23, wherein the polysaccharide comprises welan gum or xanthan gum.

26. A rapidly degrading ice control formulation having a tailorable BOD, comprising
    a) about 75-100% of a rapidly degrading, non-toxic, biodegradable freezing point depressant,
    b) about 0.1-1:0% of a biodegradable, non-ionic surfactant,
    c) about 0.1 to 25% of a slow degrading freezing point depressant, that is non-toxic and biodegradable and selected from the group consisting of triethylene glycol and tetraethylene glycol.

27. The ice control formulation according to claim 26, wherein the rapidly degrading freezing point depressant comprises glycerol.

28. The ice control formulation according to claim 26, further comprising a non-toxic and biodegradable thickener.

29. The ice control formulation according to claim 28, wherein the thickener comprises a polysaccharide.

30. The ice control formulation according to claim 29, wherein the thickener further comprises clay.

31. The ice control formulation according to claim 29, wherein the polysaccharide comprises welan gum or xanthan gum.

32. A slow degrading anti-icing formulation having a tailorable BOD, comprising
    a) about 30-70% of a slow degrading, non-toxic, biodegradable freezing point depressant;
    b) about 0.1-1.0% of a polysaccharide thickener;
    c) about 0.1-1.0% of a biodegradable, non-ionic surfactant;
    d) about 0.1-50% of a rapidly degrading, non-toxic, biodegradable freezing point depressant; and
    e) water
    wherein the slow degrading freezing point depressant and the rapidly degrading freezing point depressant are in a ratio that provides a composition that has a five day BOD ranging from about 40 g/kg to about 840 g/kg.

33. An ice control composition having a tailored rate of degradation comprising
    a) at least one freezing point depressant that is non-toxic and biodegradable,
    b) at least a second FPD that is non-toxic and biodegradable;
    c) at least one surfactant, wherein the surfactant is non-ionic, non-toxic and biodegradable; and
    at least one thickener,
    wherein the first FPD of (a) and the second FPD of (b) are present in a ratio of about 1:1.

34. A method of tailoring the biodegradability of a de-icing composition having a tailorable BOD to form a biotreatable composition, comprising:
    a) providing at least one slowly degrading freezing point depressant (FPD) that is non-toxic and biodegradable and is selected from the group consisting of triethylene glycol and tetraethylene glycol;
    b) providing at least one rapidly degrading FPD that is non-toxic and biodegradable and is selected from the group consisting of glycerol, propylene glycol, and 1,3 butanediol;
    c) providing at least one surfactant, wherein the surfactant is non-ionic, non-toxic and biodegradable; and
    d) mixing the at least one slowly degrading FPD, the at least one rapidly degrading FPD, and the at least one surfactant, wherein the ratio of the at least one slowly degrading FPD to the at least one rapidly degrading FPD provides an ultimate BOD less than 1680 g/kg and a five day BOD at least 90% of the ultimate BOD.

* * * * *